(12) United States Patent
Pawelzik et al.

(10) Patent No.: US 11,486,649 B2
(45) Date of Patent: Nov. 1, 2022

(54) CYLINDRICAL AIR TO AIR HEAT EXCHANGER

(71) Applicant: MAICO ELEKTROAPPARATE-FABRIK GMBH, Villingen-Schwenningen (DE)

(72) Inventors: Ole Pawelzik, Villingen-Schwenningen (DE); Alfred Bolli, Hüfingen (DE)

(73) Assignee: MAICO ELEKTROAPPARATE-FABRIK GMBH, Villingen-Schwenningen (DE)

( * ) Notice: Subject to any disclaimer, the term of this patent is extended or adjusted under 35 U.S.C. 154(b) by 15 days.

(21) Appl. No.: 15/537,203

(22) PCT Filed: Dec. 16, 2015

(86) PCT No.: PCT/EP2015/079964
§ 371 (c)(1),
(2) Date: Jun. 16, 2017

(87) PCT Pub. No.: WO2016/096965
PCT Pub. Date: Jun. 23, 2016

(65) Prior Publication Data
US 2017/0350655 A1    Dec. 7, 2017

(30) Foreign Application Priority Data

Dec. 18, 2014 (DE) .......................... 102014019173.7
Apr. 21, 2015 (CH) ..................................... 00548/15

(51) Int. Cl.
*F28D 7/00* (2006.01)
*F28D 7/16* (2006.01)
(Continued)

(52) U.S. Cl.
CPC ............ *F28D 7/1676* (2013.01); *F24F 7/013* (2013.01); *F24F 12/006* (2013.01);
(Continued)

(58) Field of Classification Search
CPC .... F28D 7/1676; F28D 9/0018; F28D 9/0062; F28D 9/0068; F28D 21/0014;
(Continued)

(56) References Cited

U.S. PATENT DOCUMENTS 2,393,840 A * 1/1946 Tinker ...................... F01N 5/00
165/154
2,428,066 A * 9/1947 Ellis ................... B60H 1/00335
165/154
(Continued)

FOREIGN PATENT DOCUMENTS

DE    102005035712 A1    2/2007
DE    202010008955 U1    2/2012
(Continued)

OTHER PUBLICATIONS

English Translation of the International Preliminary Report on Patentability, IB, Geneva, dated Mar. 31, 2017, incorporating the English Translation of the Written Opinion of the ISA, dated Feb. 17, 2016.
(Continued)

*Primary Examiner* — Travis Ruby
(74) *Attorney, Agent, or Firm* — Harness, Dickey & Pierce, P.L.C.; Stephen T. Olson

(57) ABSTRACT

A heat exchanger for heat exchange between at least two fluids includes a plurality of heat exchange elements each having at least one fluid-guiding path for conducting at least one of the fluids through. The heat exchanger has a cylindrical shape or substantially cylindrical shape with a cylinder axis around which the heat exchange elements are adjacently arranged. At lease a region of each of the heat exchange elements forms an outline structure at least substantially like one of a triangular cylinder, a trapezoidal cylinder, a circle-sector cylinder, and an annulus-sector cylinder. As a result of adjacent arrangement of the heat (Continued)

Figure 1:
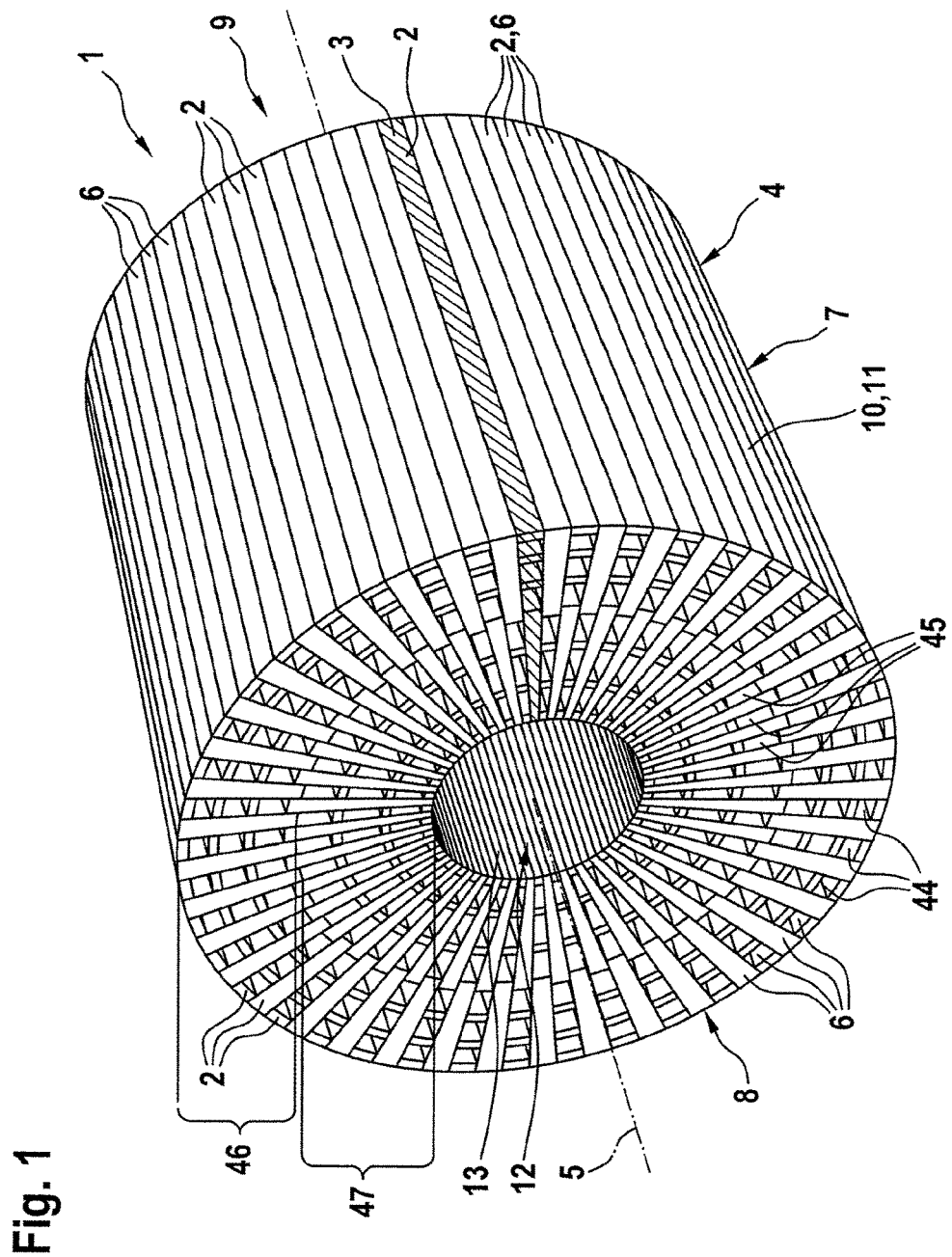

exchange elements, the heat exchanger or at least a region of the heat exchanger has an outline structure at least substantially like one of a polygonal cylinder, a polygonal hollow cylinder, a circular cylinder, and annular cylinder. The cylindrical shape of the heat exchanger may alternatively be a cone frustum. The heat exchanger may be incorporated into an air device.

34 Claims, 18 Drawing Sheets

(51) Int. Cl.
- F24F 12/00 (2006.01)
- F28D 9/00 (2006.01)
- F28D 21/00 (2006.01)
- F28F 9/02 (2006.01)
- F24F 7/013 (2006.01)
- F24F 3/147 (2006.01)

(52) U.S. Cl.
CPC ......... *F28D 9/0018* (2013.01); *F28D 9/0068* (2013.01); *F28D 21/0014* (2013.01); *F28D 21/0015* (2013.01); *F28F 9/0268* (2013.01); *F24F 3/147* (2013.01); *F24F 2203/104* (2013.01); *Y02B 30/56* (2013.01)

(58) Field of Classification Search
CPC ....... F28D 21/0015; F24F 3/147; F24F 7/013; F24F 12/006; F24F 2203/104; F28F 9/0268

See application file for complete search history.

(56) References Cited

U.S. PATENT DOCUMENTS

| | | | | |
|---|---|---|---|---|
| 2,485,088 A * | 10/1949 | Ellis | | F28D 9/0018 165/83 |
| 3,198,248 A * | 8/1965 | Stack | | F28D 9/0068 165/166 |
| 3,255,818 A * | 6/1966 | Beam, Jr. | | F02G 5/02 165/166 |
| 3,507,115 A * | 4/1970 | Wisoka | | F02C 7/08 165/166 |
| 4,006,672 A * | 2/1977 | Matsuyoshi | | F04D 25/14 454/343 |
| 4,040,804 A * | 8/1977 | Harrison | | F24F 3/147 165/165 |
| 4,183,403 A * | 1/1980 | Nicholson | | F28D 9/0062 165/166 |
| 4,343,354 A | 8/1982 | Weber | | |
| 4,438,809 A * | 3/1984 | Papis | | F28D 9/0018 165/166 |
| 4,497,361 A * | 2/1985 | Hajicek | | F24F 3/1423 165/10 |
| 4,523,630 A * | 6/1985 | Wiklund | | F04D 19/022 165/54 |
| 4,574,872 A * | 3/1986 | Yano | | F24F 3/147 165/10 |
| 4,582,126 A * | 4/1986 | Corey | | F02F 7/0087 165/82 |
| 4,691,764 A * | 9/1987 | Durst | | F28D 9/0018 165/165 |
| 4,749,032 A * | 6/1988 | Rosman | | F28D 9/0018 165/167 |
| 4,799,539 A | 1/1989 | Atkin et al. | | |
| 4,890,670 A * | 1/1990 | Schiessl | | F28D 9/0062 165/143 |
| 5,469,914 A * | 11/1995 | Davison | | F28D 9/0037 165/166 |
| 5,766,073 A * | 6/1998 | O'Kelley | | F24F 7/013 454/354 |
| 6,102,111 A * | 8/2000 | Kamio | | F28D 9/0018 165/165 |
| 6,216,774 B1 | 4/2001 | Tsunoda | | |
| 6,223,808 B1 * | 5/2001 | Tsunoda | | F28D 9/0018 165/162 |
| 6,263,961 B1 * | 7/2001 | Antoine | | F28D 9/0018 165/164 |
| 6,289,978 B1 * | 9/2001 | Antoine | | F28D 9/0018 165/164 |
| 6,935,416 B1 * | 8/2005 | Tsunoda | | F28D 9/0018 165/166 |
| 6,951,110 B2 | 10/2005 | Kang | | |
| 2002/0003036 A1 * | 1/2002 | Tsunoda | | F28D 9/0018 165/166 |
| 2002/0073688 A1 * | 6/2002 | Bosley | | F02C 3/05 60/39.511 |
| 2002/0124569 A1 * | 9/2002 | Treece | | F02C 3/05 60/772 |
| 2003/0131978 A1 * | 7/2003 | Nakano | | F28D 9/0018 165/164 |
| 2003/0218096 A1 * | 11/2003 | Marche | | B64D 13/00 244/118.5 |
| 2004/0112576 A1 * | 6/2004 | Meshenky | | F02B 29/0462 165/125 |
| 2005/0098309 A1 * | 5/2005 | Kang | | F28D 9/0018 165/166 |
| 2006/0153755 A1 * | 7/2006 | Obuchi | | B01D 53/8668 422/198 |
| 2008/0031735 A1 * | 2/2008 | Chen | | F03D 1/025 416/128 |
| 2009/0314480 A1 * | 12/2009 | Grinbergs | | F24F 3/1411 165/174 |
| 2012/0216544 A1 * | 8/2012 | Eleftheriou | | F02C 7/08 60/772 |
| 2013/0233514 A1 * | 9/2013 | Mariotto | | F24F 3/147 165/104.14 |
| 2014/0076527 A1 * | 3/2014 | Grinbergs | | F28D 9/0068 165/166 |
| 2014/0260398 A1 * | 9/2014 | Kozubal | | F25B 15/00 62/271 |
| 2014/0262174 A1 * | 9/2014 | Wunning | | F28D 7/1661 165/158 |
| 2015/0075758 A1 * | 3/2015 | Ishimaru | | F28F 3/048 165/167 |
| 2015/0276256 A1 * | 10/2015 | Erb | | B21D 53/02 165/104.14 |
| 2016/0231016 A1 * | 8/2016 | Roos | | F24F 13/30 |
| 2016/0265805 A1 * | 9/2016 | Landry | | F24F 12/006 |
| 2017/0328645 A1 * | 11/2017 | Shao | | F28D 9/0012 |
| 2018/0056265 A1 * | 3/2018 | Rizzi | | B01J 8/0214 |
| 2018/0112927 A1 * | 4/2018 | Hirsch | | B60H 1/00321 |

FOREIGN PATENT DOCUMENTS

| | | |
|---|---|---|
| EP | 0933609 A1 | 8/1999 |
| GB | 2439557 A | 1/2008 |
| WO | WO-2013/041066 A2 | 3/2013 |
| WO | WO-2016/147147 A2 | 9/2016 |

OTHER PUBLICATIONS

International Search Report for PCT/EP2015/079964, ISA/EP, Rijswijk, NL, dated Feb. 17, 2016, with translation.
Written Opinion of the ISA for PCT/EP2015/079964, ISA/EP, Rijswijk, NL, dated Feb. 17, 2016.
International Preliminary Report on Patentability (Ch. II) with annexes and their translation, IPEA/EP, Munich, dated Mar. 31, 2017.

* cited by examiner

CYLINDRICAL AIR TO AIR HEAT EXCHANGER

CROSS-REFERENCE TO RELATED APPLICATIONS

This application is a 371 U.S. National Stage of International Application No. PCT/EP2015/079964, filed Dec. 16, 2015, which claims the benefit of and priority to German Patent Application No. 10 2014 019 173.7, filed Dec. 18, 2014 and Swiss Patent Application 00548/15, filed Apr. 21, 2015. The disclosures of the above applications are incorporated herein by reference.

FIELD

The invention relates to a heat exchanger.

BACKGROUND

Heat exchangers for heat exchange between at least two fluids are known. For example, heat exchangers are used for heat recovery in devices for home ventilation/home air conditioning. Supply/external air and exhaust air flow through these heat exchangers and as a result, the temperature of the supply/exhaust air, for example in winter, is raised by the heat of the exhaust air. With regard to their volume active for the heat supply rate and/or with regard to the exchange surface providing the heat exchange, the known heat exchangers are in need of improvement.

The invention thus addresses the problem of creating a heat exchanger which has a particularly favorable volume with regard to its heat supply rate and/or an optimally large exchange surface for the heat exchange. Furthermore, a particularly low sound power level is sought. The simple connection of fluid lines and/or at least one fluid transport device, for example a fan, is also of great importance. In addition, a small size is desirable.

SUMMARY

This problem is solved in a heat exchanger for heat exchange between at least two fluids in that it has a plurality of heat exchange elements, each of which has at least one fluid-guiding path for conducting at least one of the fluids through, wherein the heat exchanger has a cylindrical shape or substantially a cylindrical shape having a cylinder axis, and the heat exchange elements are arranged adjacent to each other around the cylinder axis, wherein each of the heat exchange elements or at least a region of each of the heat exchange elements forms an outline structure like a or substantially like a:
 triangular cylinder or
 trapezoidal cylinder or
 circle-sector cylinder or
 annulus-sector cylinder,
wherein, by means of the heat exchange elements arranged adjacent to each other, the heat exchanger or at least a region of the heat exchanger has an outline structure like a or substantially like a:
 polygonal cylinder or
 polygonal hollow cylinder or
 circular cylinder or
 annular cylinder.

Due to the design of the heat exchange elements as triangular cylinder, or trapezoidal cylinder, or circle-sector cylinder, or annulus-sector cylinder and their adjacent arrangement around the cylinder axis, thus—depending on the cylinder shape of the heat exchange elements—forming a polygonal cylinder, or a polygonal hollow cylinder, or a circular cylinder, or an annular cylinder, an optimal heat exchange volume and an optimal heat exchange surface is created, wherein a relatively small size is still maintained. The space provided for the heat exchange or the heat exchange surface provided for the heat exchange is optimized due to the geometric design of the heat exchange elements and the entire heat exchanger. Due to the invention, the heat supply rate is optimized. If the heat exchanger has a circular cross-section, the heat supply rate is maximized. Particularly the adjacent arrangement of the heat exchange elements as triangular cylinders results in an outline structure of the polygonal cylinder for the heat exchanger. Heat exchange elements designed as trapezoidal cylinder result in a polygonal hollow cylinder, wherein the polygonality refers to both the outer jacket and the inner jacket. If circle-sector cylinders are used as heat exchange elements, the heat exchanger has an outline structure similar to the circular cylinder. Since the individual heat exchange elements become increasingly slimmer toward the center of the cylinder and are difficult to produce for that purpose and only show little effectiveness with regard to the heat exchange, it is advantageous to design the heat exchange elements as annulus-sector cylinder, resulting in an outline structure of the heat exchanger similar to an annular cylinder. This last design is particularly preferred.

The different cylinder types of the outline structure of the heat exchanger are preferably designed as straight cylinders. Alternatively, a design as oblique cylinders is possible. For straight cylinders, this means that front sides run at a right angle to the cylinder axis, whereby one can be denoted as base side and the other one as top side.

In the heat exchanger according to the invention, it is particularly and advantageously provided that the feed and removal of the at least two fluids take place at the aforementioned front sides of the heat exchanger, i.e. at the front sides of the polygonal cylinder, or at the front sides of the polygonal hollow cylinder, or at the front sides of the circular cylinder, or at the front sides of the annular cylinder. In particular, one of the fluids is fed to an area of a front side, subsequently permeates the heat exchanger, and is removed in an area of the other front side. The other one of the fluids is fed to an area of the other front side, subsequently permeates the heat exchanger, and is removed in an area of the one front side.

Due to the flow through the heat exchanger, heat is exchanged between the two fluids. Fluidically, the two fluids are separate from one another, i.e. no mixing takes place. The two fluids are preferably gaseous fluids, particularly air.

This problem is further solved by a heat exchanger for heat exchange between at least two fluids with a plurality of heat exchange elements, each having at least one fluid-guiding path for channeling at least one of the fluids, wherein the heat exchanger has a or substantially has a cone frustum shape with a cone frustum axis, and the heat exchange elements are arranged adjacent to one another around the cone frustum axis, wherein each of the heat exchange elements or at least one region of these heat exchange elements has an outline structure like a or essentially similar like a:
 triangular cone frustum or
 trapezoidal cone frustum or
 circle-sector cone frustum or
 annulus-sector cone frustum, wherein, by means of the heat exchange elements arranged adjacent to each other, the heat exchanger or at least a region of the heat exchanger has an outline structure like a or substantially like a:

polygonal cone frustum or
  polygonal hollow cone frustum or
  circular cone frustum or
  annular cone frustum.

The above description regarding the cylindrical heat exchanger applies accordingly. Compared to the former cylindrical heat exchanger, the present heat exchanger has—as seen looking along the cone frustum axis—a cone frustum shape or an outline structure with a cone frustum shape, resulting in the corresponding above-mentioned cone frustums. For the individual heat exchange elements, which are arranged adjacent to one another around the cone frustum axis, the result is—depending on the embodiment—the corresponding aforementioned cone frustum shape.

All heat exchange elements both in the cylinder version and the cone frustum version have in common that they are designed so as to be wedge-shaped.

According to a development of the invention, it is provided that the cylinder axis is a cylinder central axis. In particular, the heat exchanger is, diametrically to the cylinder axis, structured similarly or rotationally symmetrically.

It is further advantageous if each heat exchange element only has one fluid-guiding path for conducting only one of the fluids. It is particularly provided that a heat exchange element adjoining the aforementioned heat exchange element also has only one fluid-guiding path for conducting only one of the fluids, wherein this fluid is a different fluid, and so a heat exchange between the fluids is possible between the two adjacent heat exchange elements.

A development of the invention provides that the heat exchanger and/or each heat exchange element and/or each fluid-guiding path—as seen looking in the direction of the cylinder axis or the cone frustum axis—has three zones, namely two cross-flow zones, between which a counterflow zone or an identical-flow zone is located. When looking at two fluids, one of which is fed to the one front side of the heat exchanger and the other to the other front side, it results in a fluid guidance within the heat exchanger such that after the entry of the one fluid into the heat exchanger, it first flows through a cross-flow zone, i.e. heat is exchanged with the other fluid such that both fluid flows intersect. The counterflow zone is subsequently passed, i.e. in this zone, the two fluids flow diametrically to one another. This is followed by the further cross-flow zone, in which the two fluid flows intersect again, i.e. their flow directions resemble a cross. However, the fluid flows are always separated from one another by a heat exchange wall. It is particularly provided that the counterflow zone or identical-flow zone is longer than each of the cross-flow zones; in particular, the counterflow zone or the identical-flow zone is three times, preferably four times, particularly more than four times longer than the length of a cross-flow zone (each as seen looking in the direction of the cylinder axis or cone frustum axis). Instead of the counterflow zone, there can also be the aforementioned identical-flow zone, i.e. in this zone, the two fluid flows flow in identical directions. This requires that both fluid flows are fed to the same front side of the heat exchanger and are removed from the same front side of the heat exchanger. However, the following also contains embodiments, in which feed and removal not only take place at the front side or front sides of the heat exchanger, but feed and removal take place possibly in the area or additionally also in the area of an outer jacket and/or inner jacket of the heat exchanger. The above description shall apply accordingly.

A development of the invention provides that the fluid-guiding path of the counterflow zone or the identical-flow zone runs parallel to the cylinder axis.

A development of the invention provides that the fluid-guiding path of the counterflow zone or the identical-flow zone runs parallel or approximately parallel to the cone frustum axis.

It is further advantageous if the fluid-guiding path runs from at least one of the cross-flow zones obliquely to the cylinder axis or the cone frustum axis.

According to a development of the invention, it is provided that each heat exchange element comprises a first heat exchange wall which forms a common heat exchange wall for this heat exchange element and the adjoining heat exchange element. Due to the adjacent arranging of the heat exchange elements around the cylinder axis, the heat exchange wall is thus arranged between the fluid-guiding paths of the two heat exchange elements, wherein said heat exchange wall is a common heat exchange wall.

According to an embodiment of the invention, it is provided that each heat exchange element comprises a first and a second fluid-guiding path for a corresponding conducting of one of the fluids each. In other words, the heat exchange element effectively consists of two single elements which are fluidically delimited to one another and each comprise a fluid-guiding path, and so two fluids can flow through the fluid-guiding paths, which at least in sections preferably takes place reversely.

According to a development of the invention, it is provided that each heat exchange element comprises a second heat exchange wall which separates the first and the second fluid-guiding path from one another in this heat exchange element. This design is particularly provided for the heat exchange element with the two fluid-guiding paths.

A development of the invention provides that the second heat exchange wall is configured such that it keeps adjoining first heat exchange walls at a distance to one another. The second heat exchange wall has thus a double function, i.e. it separates the two fluids from one another further and serves as spacer for adjoining first heat exchange walls. It can be particularly provided that the second heat exchange wall has at least in sections an uneven, particularly zigzag-shaped, wavelike and/or meandering profile. This said profile of the second heat exchange wall allows it to fulfill its separating function and also its function as spacer particularly well. For example, if the second heat exchange wall has a zigzag-shaped profile, a first heat exchange wall can bear against the spikes on the one side, and a further heat exchange wall can bear against the spikes on the other side. As a result, the two first heat exchange walls are kept at a distance, and the hollow spaces created by the zigzag profile serve to channel the two fluids and, of course, also for their fluidic separation.

According to a development of the invention, it is provided that the first heat exchange wall and/or the second heat exchange wall extends from an outer side/outer jacket of the heat exchanger to an inner side/inner jacket or a center/cylinder axis/cone frustum axis of the heat exchanger. The heat exchange walls thus run from the outer side, i.e. from the outer jacket of the heat exchanger into the inner side, for example, the inner jacket in case of a hollow cylinder, or into the center (particularly to the cylinder axis/cone frustum axis) of the heat exchanger if no hollow cylinder/hollow cone frustum is present.

According to a development of the invention, it is provided that at least one spacer rib is arranged between adjacent first heat exchange walls and/or between adjacent first and second heat exchange walls. Particularly when the first and/or second heat exchange walls are made of a very thin material and/or have no sufficient inherent rigidity, the at least one spacer rib has a stabilizing effect on these heat exchange walls. The first and/or second heat exchange walls can allow for diffusion. In such case, such a heat exchanger is to be termed enthalpy. If the aforementioned heat exchange walls are configured to be diffusion-resistant, it is called a sensitive heat exchanger.

It can preferably be provided that the at least one spacer rib is a fluid-guiding rib. It would thus have a double function by keeping the first and/or second heat exchange wall at a distance from one another and also stabilizing them as well as additionally providing a flow-guiding function for at least one fluid. Such a spacer rib can preferably permeate a fluid-guiding path in longitudinal extension and holds the corresponding heat exchange wall, but separates the fluid-guiding path at least in sections into two portions (partial fluid-guiding paths along its longitudinal extension). Of course, there can also be a plurality of fluid-guiding ribs within a fluid-guiding path, thus creating a multichannel flow structure. Such a fluid-guiding rib can also edge/delimit the fluid-guiding path.

A development of the invention provides that the first and/or the second heat exchange wall is configured to be fluid-selectively permeable, particularly diffusion-open. Preferably, it is possible that at least one of the heat exchange walls is permeable for water vapor but not for air. This heat exchanger is then also referred to as enthalpy. In such an embodiment, a moisture recovery can take place. Depending on the environmental parameters, it is possible during operation for moisture to form in the heat exchanger which can permeate the first and/or second heat exchange wall and can, e.g. thus be collected. However, alternatively, it is also conceivable to design the heat exchanger as a so-called sensitive heat exchanger, in which the first and/or second heat exchange wall is designed so as to be diffusion-resistant.

A development of the invention provides that the heat exchanger comprises two front sides which are opposite from one another and which have fluid openings, particularly fluid inlet openings and fluid outlet openings. As already mentioned initially, the front side forms a base side with regard to the cylindrical design of the heat exchanger, and the other front side forms a top side. In/on these two sides, i.e. the two front sides, fluid inlet and fluid outlet openings are provided which form entries to and exits from the fluid-guiding paths.

A development of the invention provides that the front sides are designed so as to be planar or roof-shaped running around the cylinder axis or cone frustum axis. The roof-shaped design effectively results in a "roof ridge edge" which runs around the cylinder axis or cone frustum axis, particularly circularly around said axis. The "roof ridge edge" is the boundary between an inner zone and an outer zone, wherein fluid inlet openings and fluid outlet openings are correspondingly arranged there—as will be explained in the following.

According to a development of the invention, it is provided that the heat exchanger comprises an outer jacket and two front sides which are opposite from one another, and that at least one of the front sides and the outer jacket comprise the fluid openings, particularly fluid inlet and fluid outlet openings. Therefore, the fluid openings are arranged both on the front side and the outer jacket. It is also conceivable that the heat exchanger has an inner jacket and two front sides which are opposite from one another, and that at least one of the front sides and the inner jacket comprise the fluid openings, particularly fluid inlet and fluid outlet openings.

It is further advantageous if the heat exchanger has an outer jacket and an inner jacket, and that the outer jacket and the inner jacket comprise the fluid openings, particularly fluid inlet and fluid outlet openings.

The design of the heat exchanger can particularly be such that at least one of the front sides has an inner zone and an outer zone, which extends around the inner zone, wherein fluid openings in the inner zone are fluid inlet openings, and fluid openings in the outer zone are fluid outlet openings and/or wherein fluid openings in the outer zone are fluid inlet openings and fluid openings in the inner zone are fluid outlet openings.

According to a preferred embodiment, it is provided that the fluid openings in the inner zone on one of the front sides are fluid inlet openings for a first fluid, and that the fluid openings in the outer zone on the other front side are fluid outlet openings for the first fluid, and that the fluid openings in the inner zone on the other front sides are fluid inlet openings for a second fluid, and that the fluid openings in the outer zone on the one front side are fluid outlet openings for the second fluid. Therefore, the two fluids flow toward the different, diametrically opposed front sides of the heat exchanger, where they enter fluid inlet openings, then flow through the heat exchanger and flow out through fluid outlet openings which are located on the corresponding opposite front side. It is preferably provided that die fluid inlet openings are located in the corresponding inner zone and the fluid outlet openings are located in the corresponding outer zone. Each of the two fluid flows thus enter the corresponding inner zone and exit at the corresponding outer zone, and so, when looking at a front side, one fluid enters in the inner area, and the other fluid flows out from the outer area which extends circularly around the inner area.

According to a development of the invention, it is provided that the at least one spacer rib, particularly fluid-guiding rib, has a length greater than half of the length of the heat exchanger which extends between the front sides. Preferably, such a spacer rib extends over at least two thirds of the length of the heat exchanger.

According to a development of the invention, it is provided that the at least one spacer rib, particularly fluid-guiding rib, runs obliquely to the cylinder axis or cone frustum axis in at least one of the cross-flow zones. Looking at two adjacent fluid-guiding paths, their fluid-guiding ribs each run obliquely, i.e. reversely obliquely, to the cylinder axis or cone frustum axis in the area of the cross-flow zone in order to reach the cross-flows of the cross-flow zones.

It is advantageous if the at least one spacer rib, particularly fluid-guiding rib, runs in the counterflow zone or identical-flow zone parallel to the cylinder axis or cone frustum axis. Looking at two adjacent fluid-guiding paths, there is a reverse flow of the corresponding two fluids in the counterflow zones of those two fluid-guiding paths, i.e. parallel to the cylinder axis or cone frustum axis. The same applies to the identical-flow zones, wherein, however, the fluids flow in the same direction.

It is advantageous if at least one ring collar is provided, which is arranged on at least one of the front sides such that is separates/shields the fluid inlet openings from the fluid outlet openings located at said front side. This prevents flow shorts, i.e. an outgoing fluid is not supposed to be able to reenter at adjacent fluid openings. A fluidic separation of the fluids is thus ensured.

The invention further related to a heat exchange element for a heat exchanger, particularly a heat exchange element as previously described, wherein the heat exchange element is designed so as to be wedge-shaped and comprises at least one fluid-guiding path for conducting a fluid and which runs in axial direction, wherein the heat exchange element, due to its wedge-shaped design, has a wedge-shaped cross-section surface, wherein the axial direction runs at a right angle or approximately at a right angle to the wedge-shaped cross-section surface. The wedge shape is shown as an example in the drawings of the embodiments.

The invention further relates to a heat exchanger, having at least one heat exchange element as described in the previous paragraph, and wherein at least one further heat exchange element is provided which is not wedge-shaped but is provided with element sides which run particularly parallel to and spaced apart from one another. The at least one first-mentioned heat exchange element thus has a wedge shape, i.e. it has a wedge-shaped cross-section surface. The at least one further heat exchange element is not designed so as to be wedge-shaped but has element sides which run particularly parallel to and spaced apart from one another. With the wedge-shaped heat exchange element, the element sides form an angle, particularly an acute angle. With the further heat exchange element, there is no angular profile, instead, the two sides run parallel to one another. A person skilled in the art knows that with a specific number of wedge-shaped heat exchange elements and a specific number of not wedge-shaped heat exchange elements, such as heat exchange elements with parallel element sides, an overall contour of the heat exchanger can be achieved that is particularly advantageous for a concrete case of application. The "specific number" also comprises the number "one." The heat exchange elements with differently designed cross-section do not have to (but can) be directly adjacent to one another; for example, it is possible to arrange a plurality of wedge-shaped heat exchange elements adjacent to one another, followed by a heat exchange element without wedge shape, and then continue again to use wedge-shaped or at least one wedge-shaped heat exchange element. It is also possible to arrange a plurality of heat exchange elements without wedge shape adjacent to one another, and so on.

Finally, it is advantageous if the heat exchanger comprises at least one fan which is arranged within the at least one ring collar. Preferably, two fans are provided, wherein each is arranged within the ring collar on the front sides of the heat exchanger which are opposite from one another. The at least one fan transports the fluid, in this case air, through the corresponding fluid paths of the heat exchange elements. If such a fan is also provided on the other side of the heat exchanger, it transports the further fluid, wherein the two fluids exchange heat among one another by means of the heat exchanger.

The invention further relates to an air device having a heat exchanger as described above, and at least one fan, preferably two fans. The one fan is arranged in the at least one ring collar, but preferably, the two fans are arranged in one ring collar each.

DETAILED DESCRIPTION OF THE DRAWINGS

Figure 2:
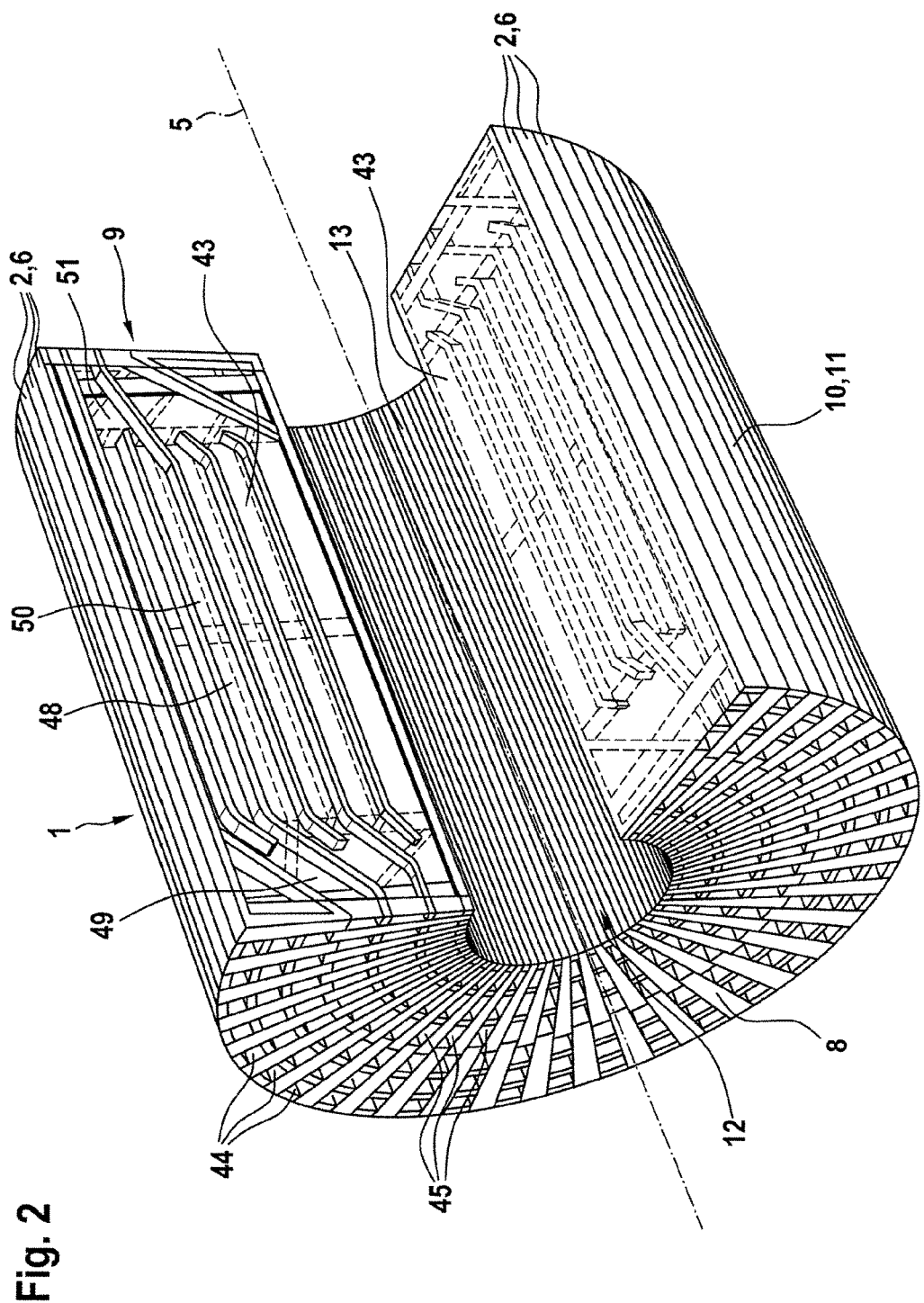
Figure 3:
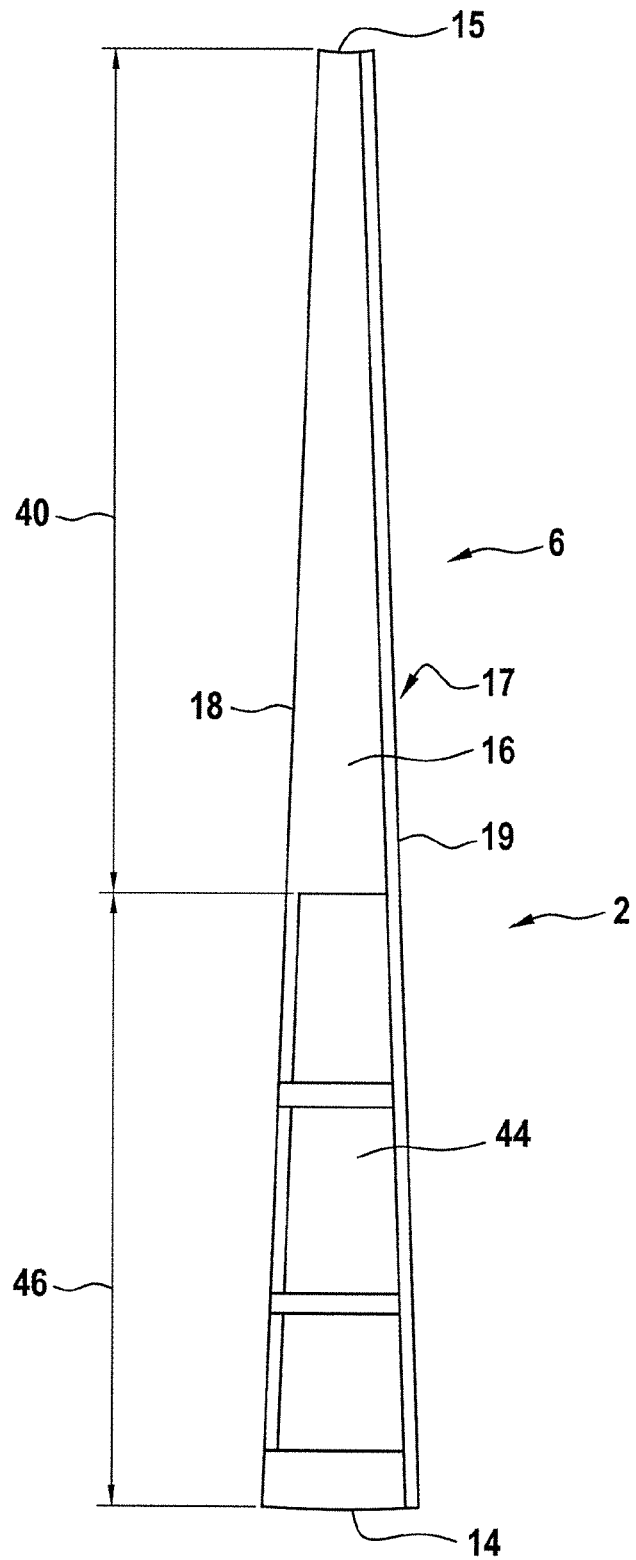
Figure 4:
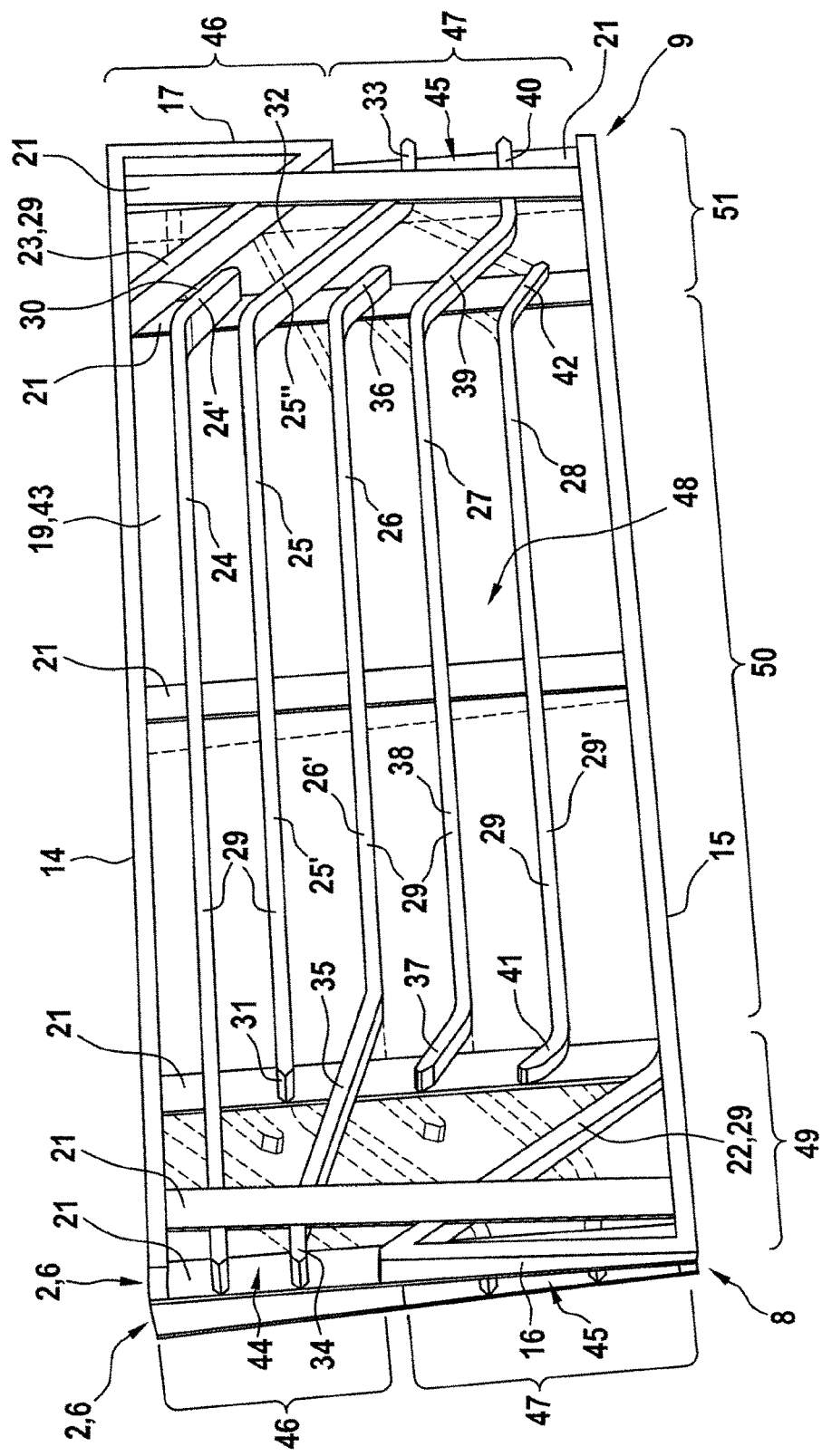
Figure 5:
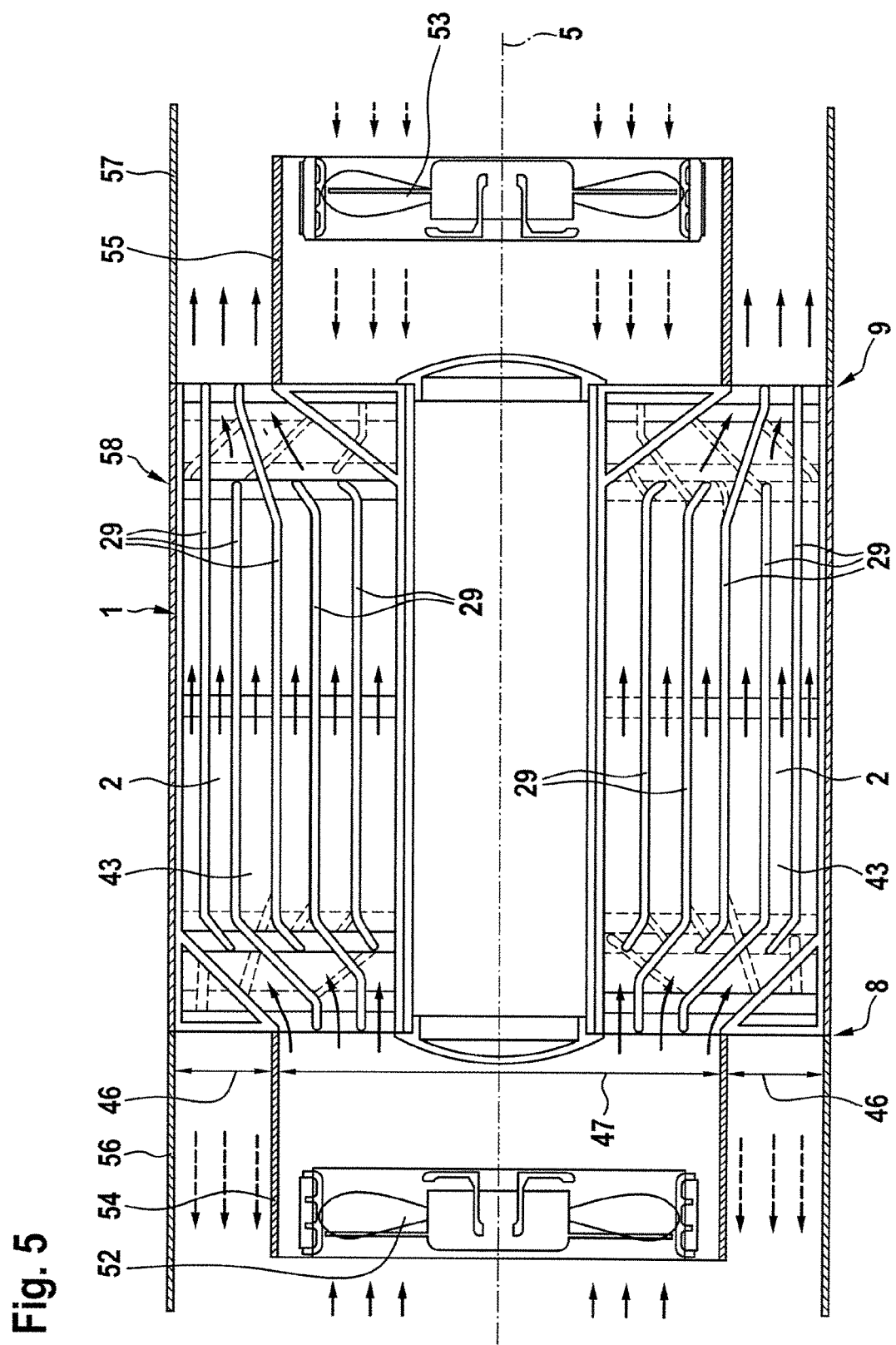
Figure 6:
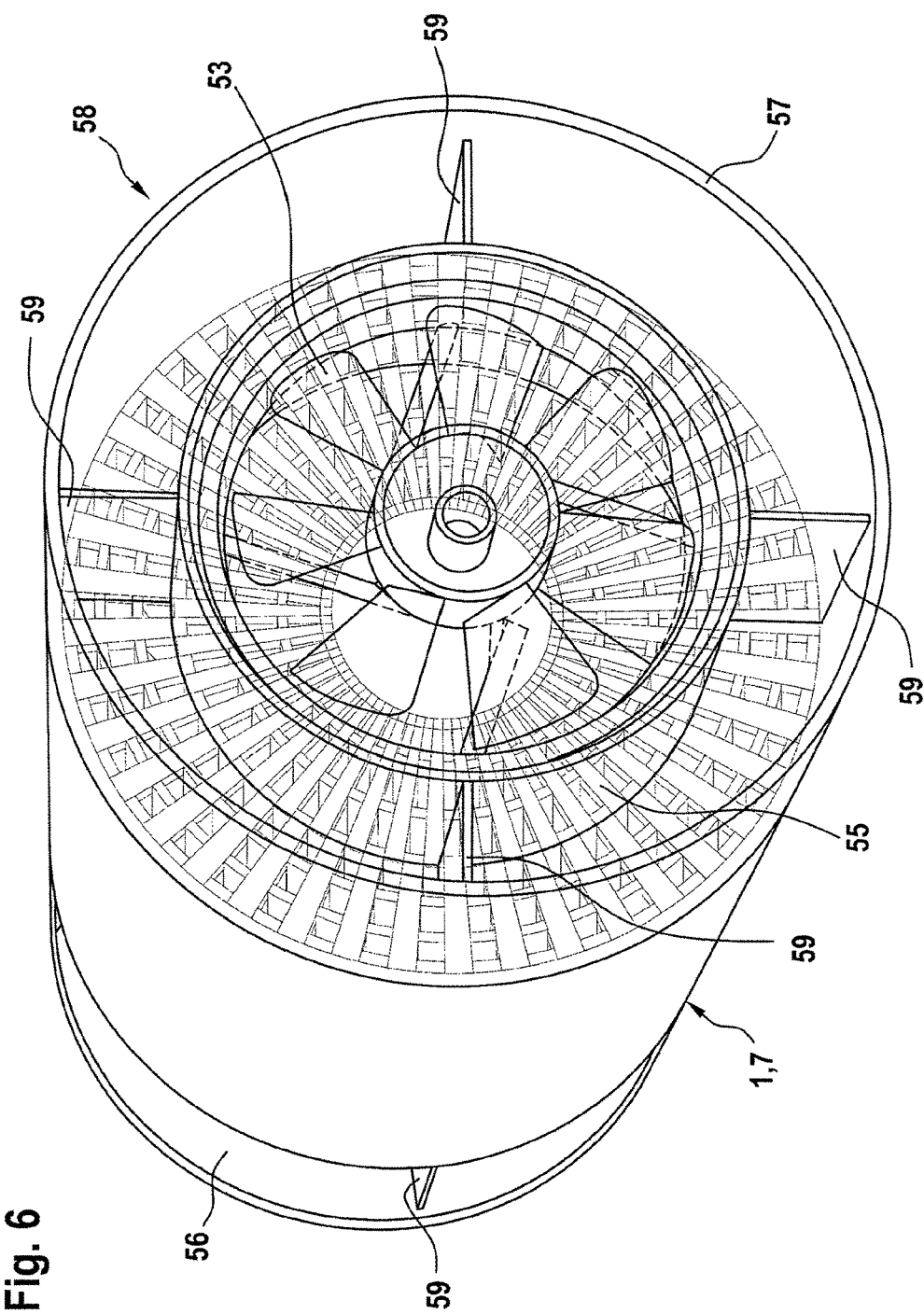
Figure 7:
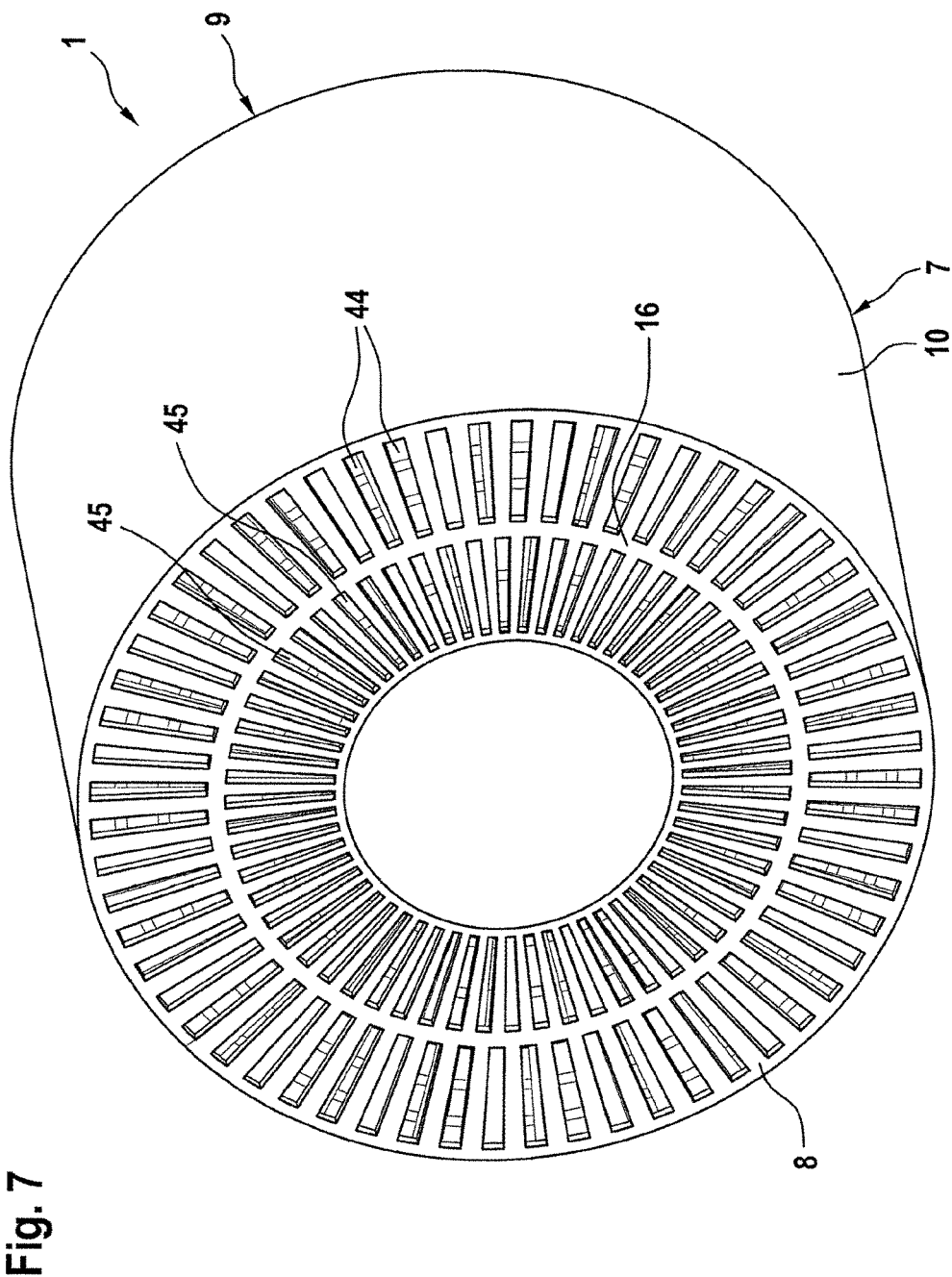
Figure 8:
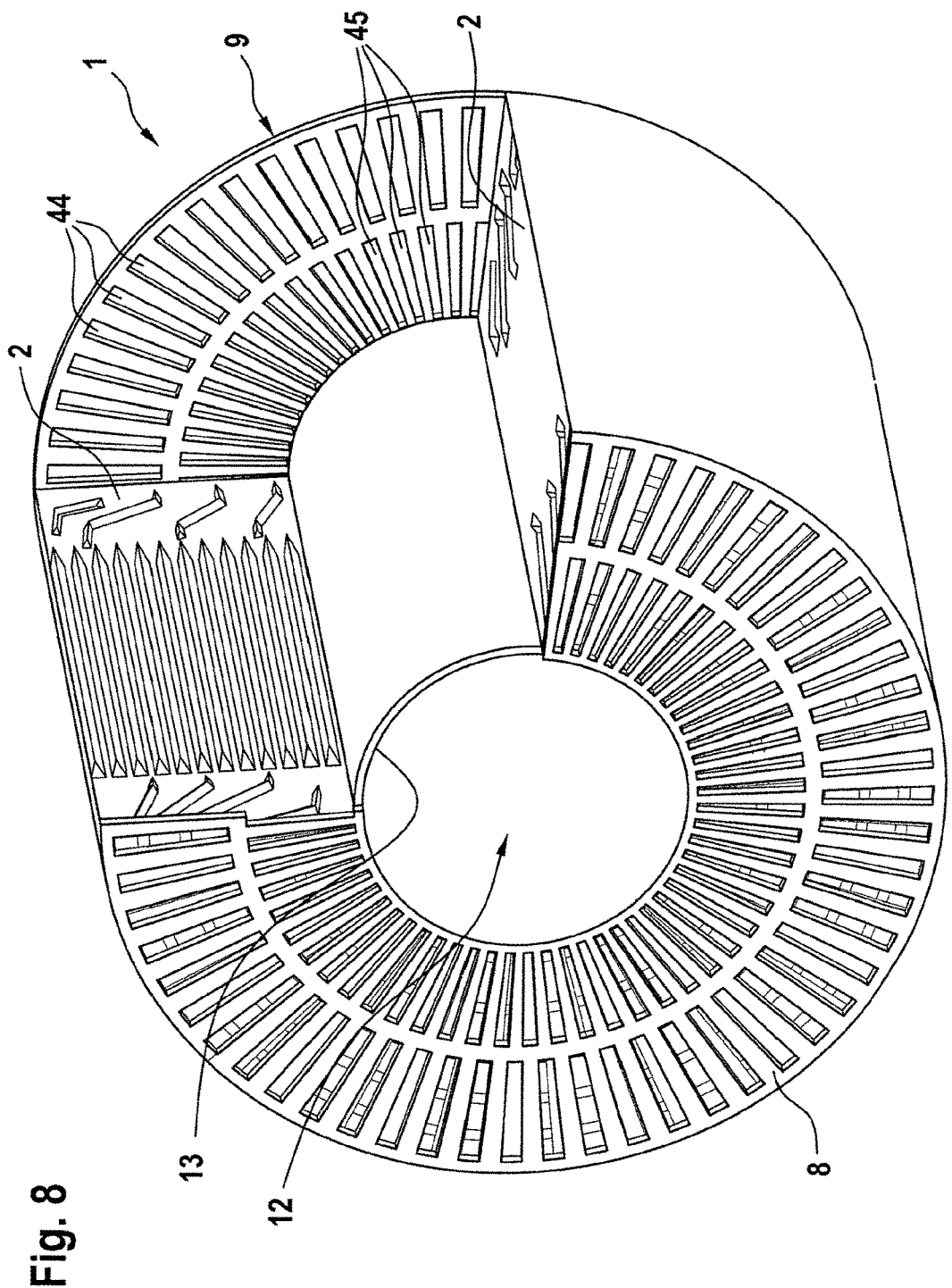
Figure 9:
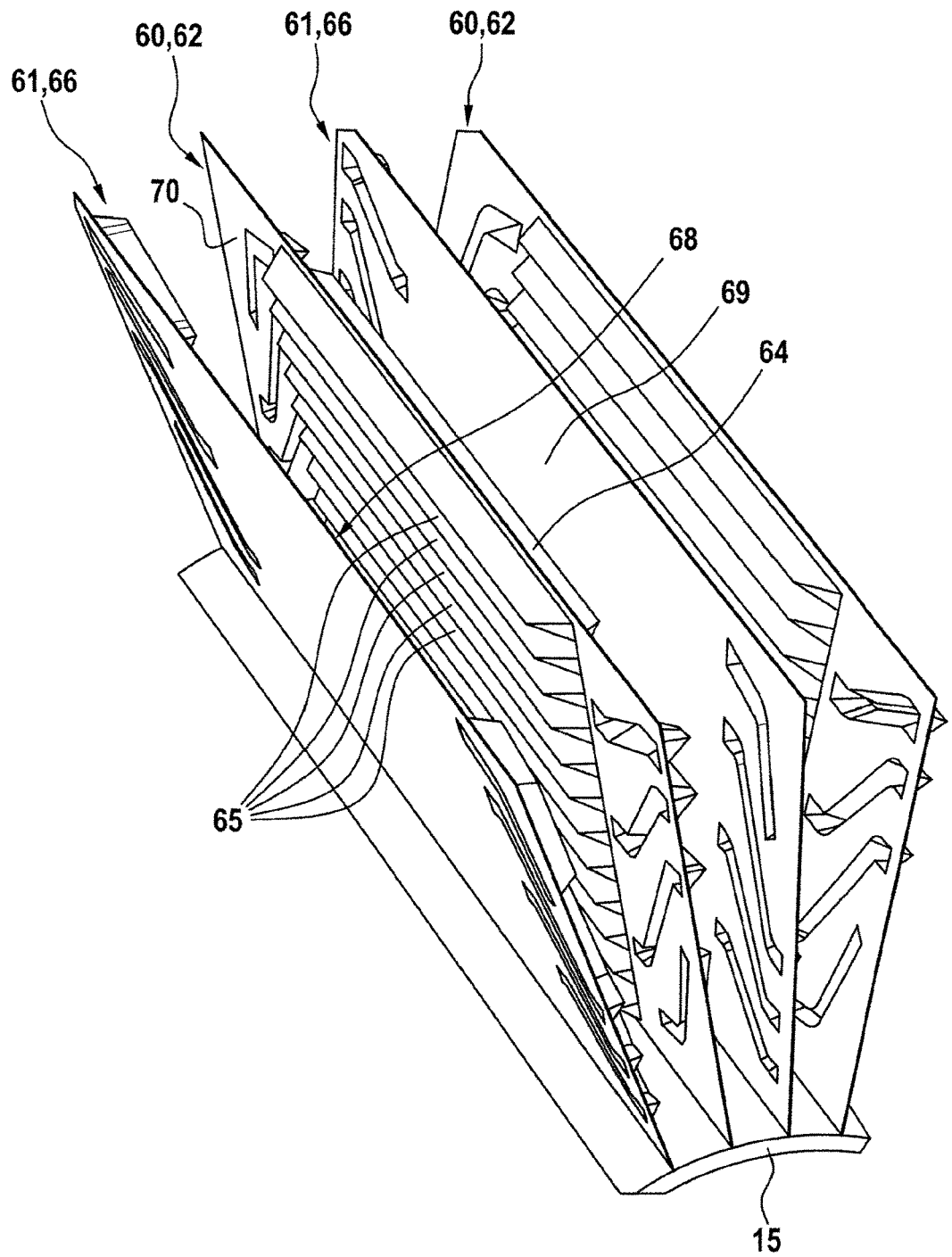
Figure 10:
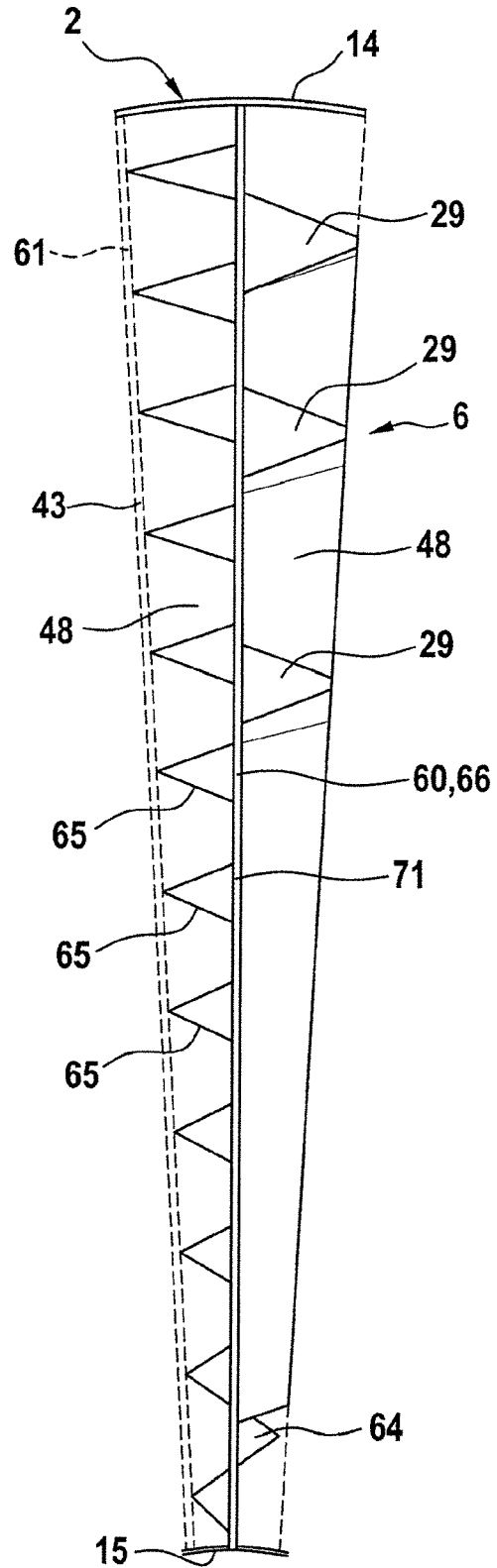
Figure 11:
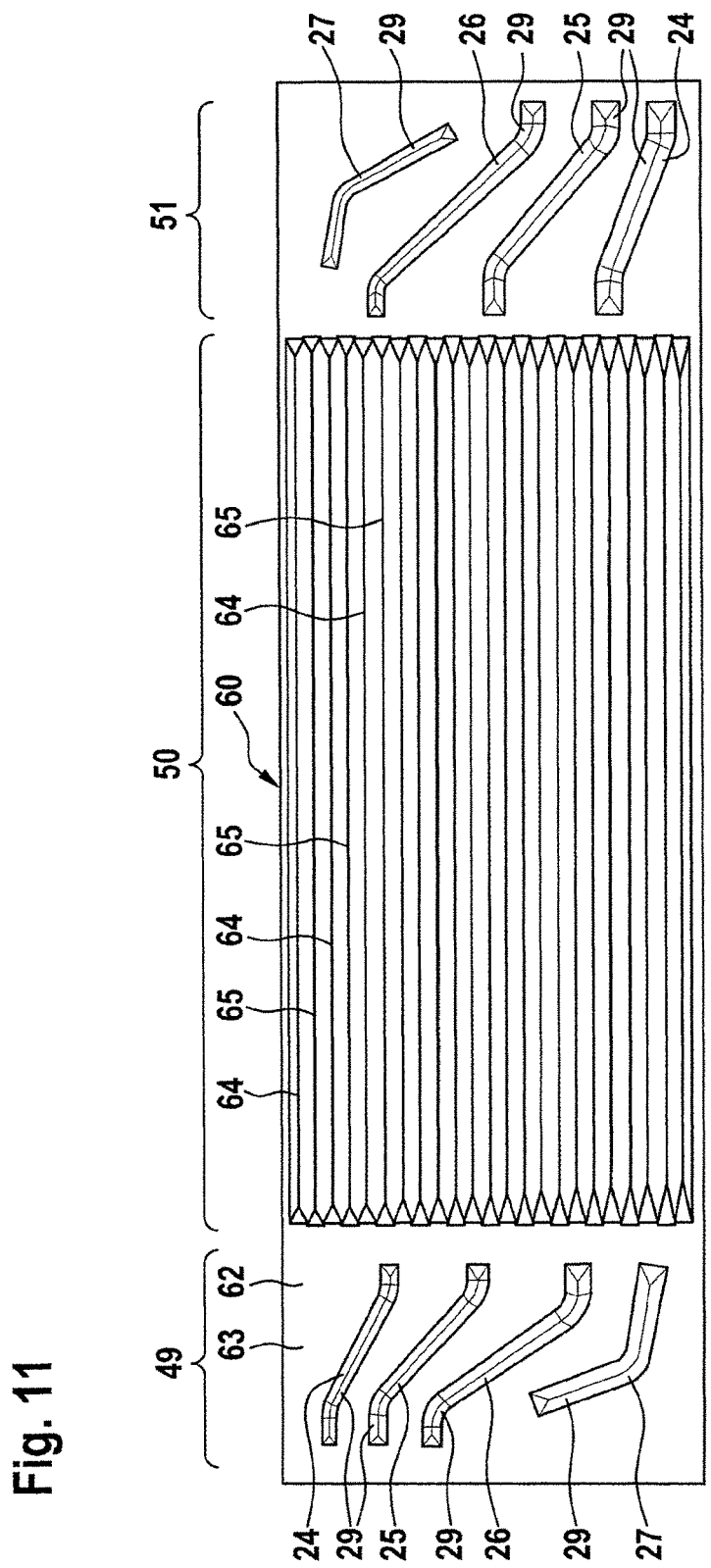
Figure 12:
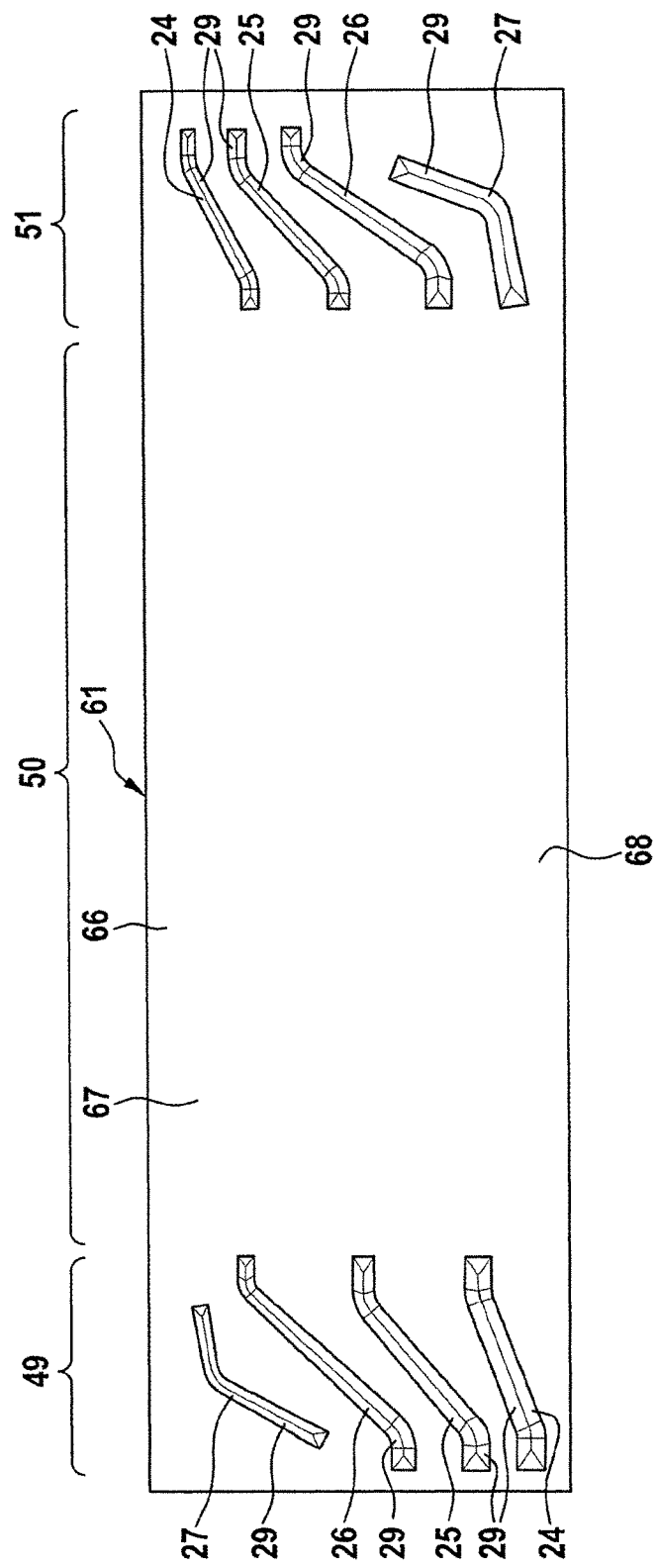
Figure 13:
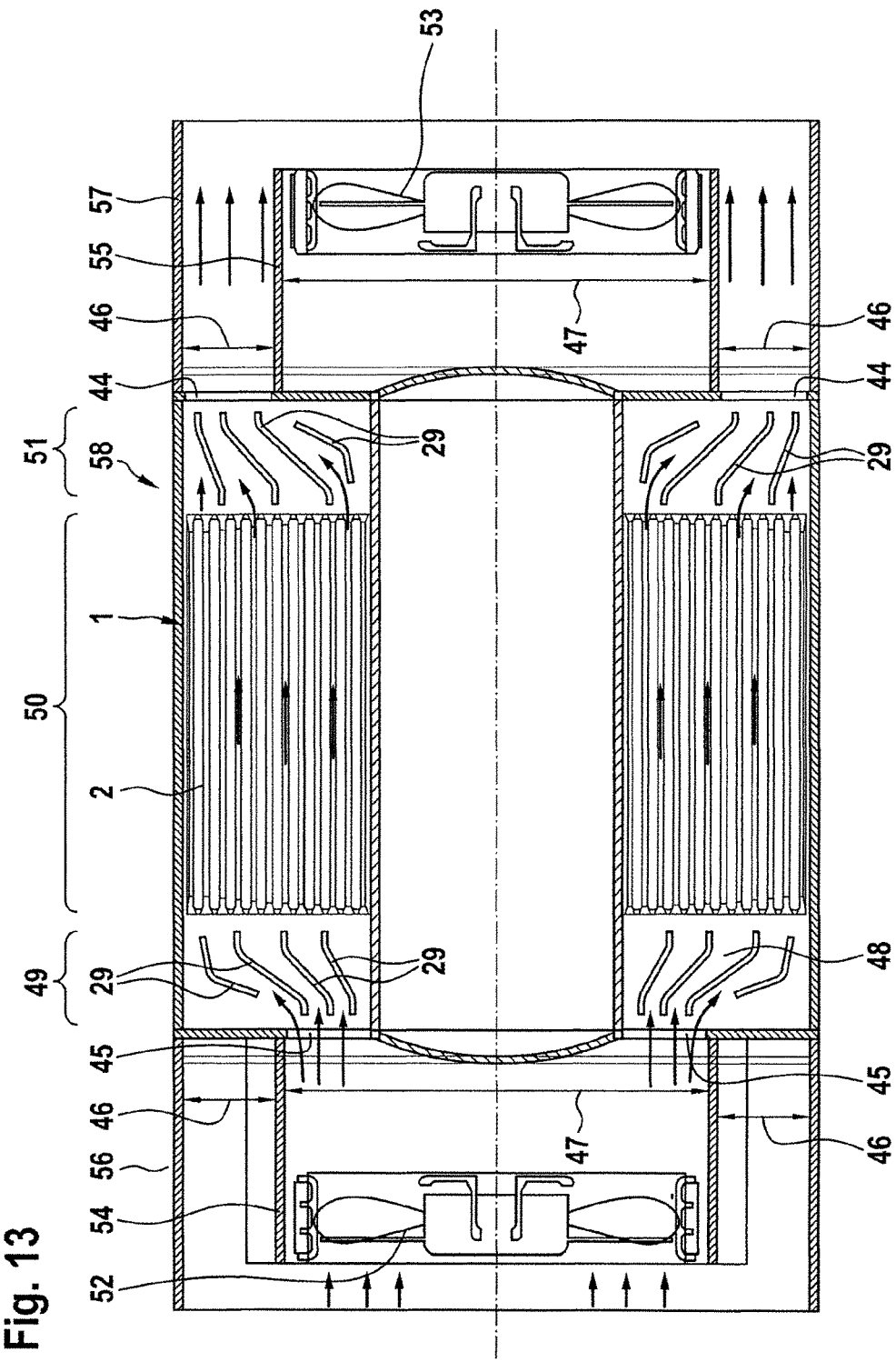
Figure 14:
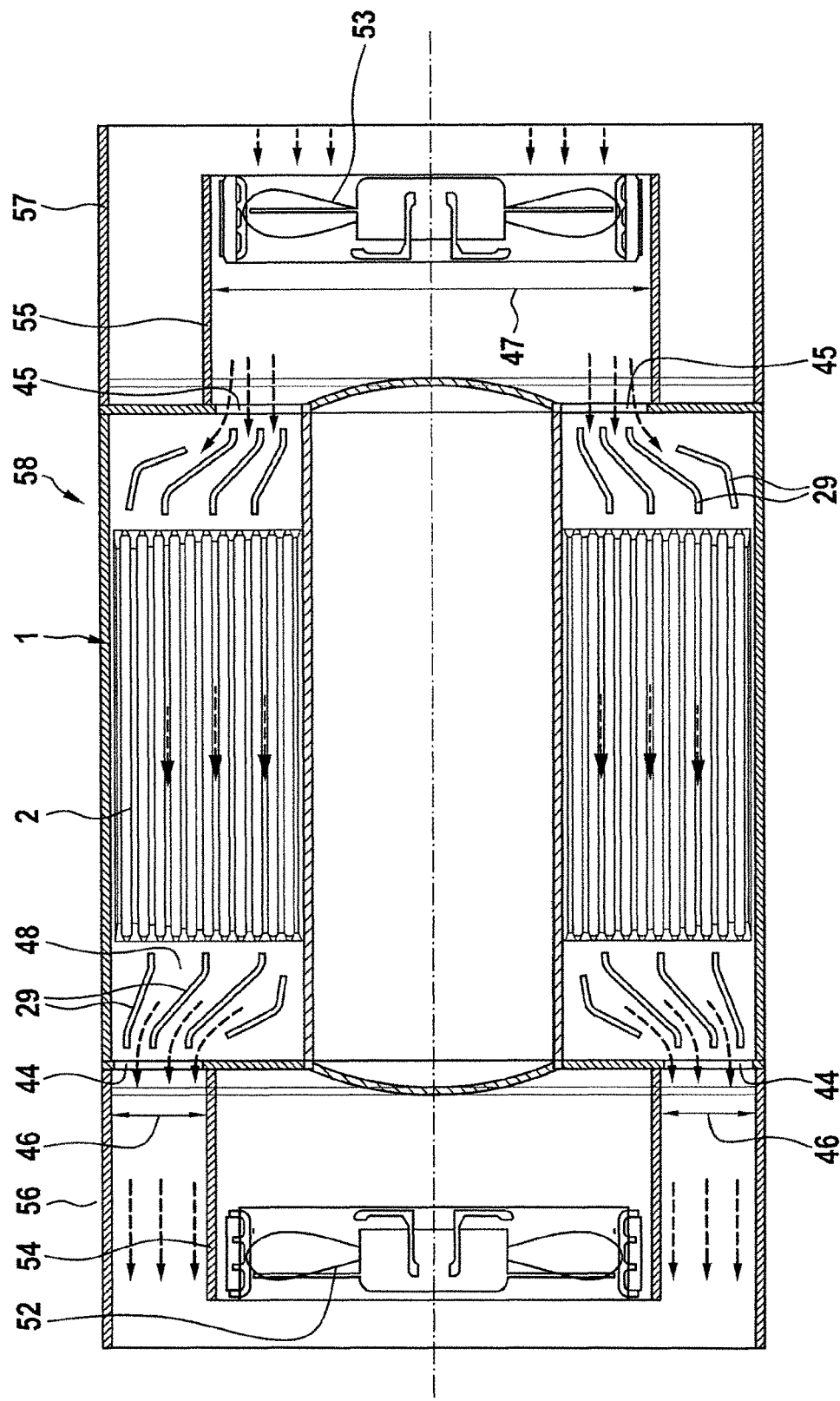
Figure 15:
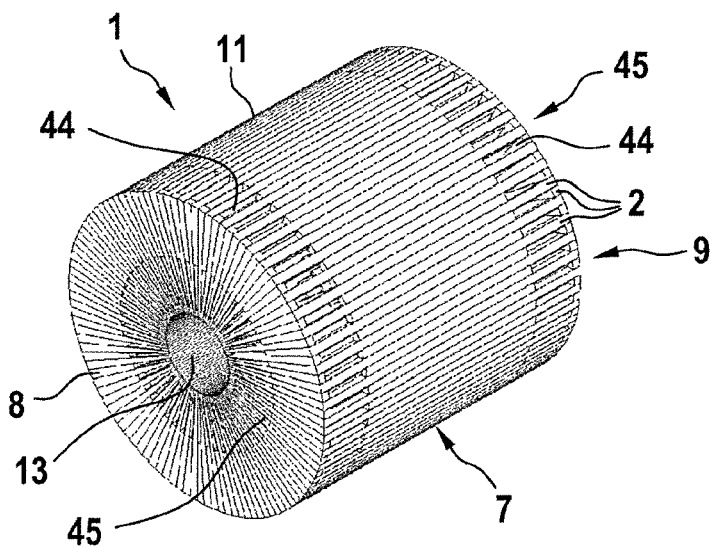
Figure 16:
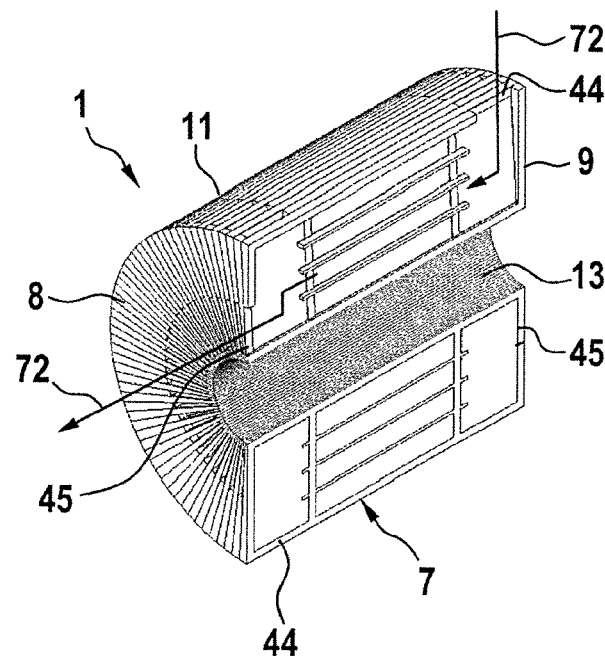
Figure 17:
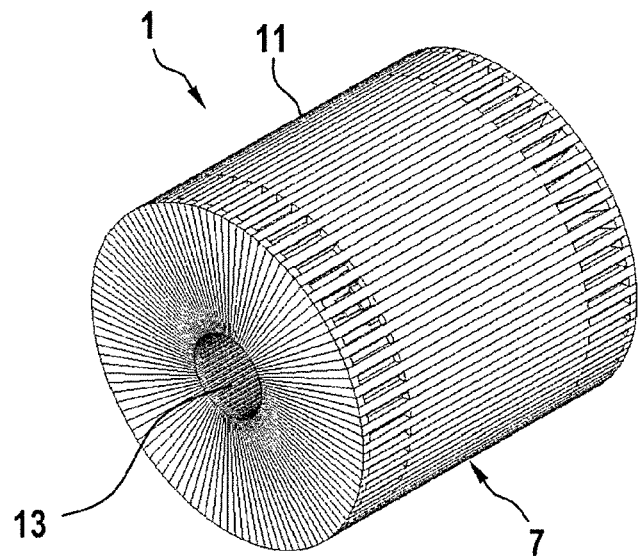
Figure 18:
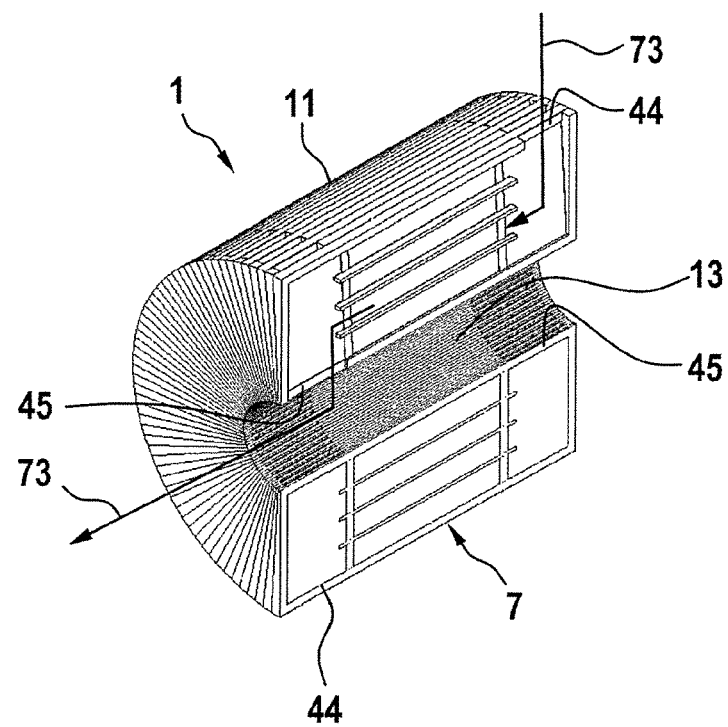
Figure 19:
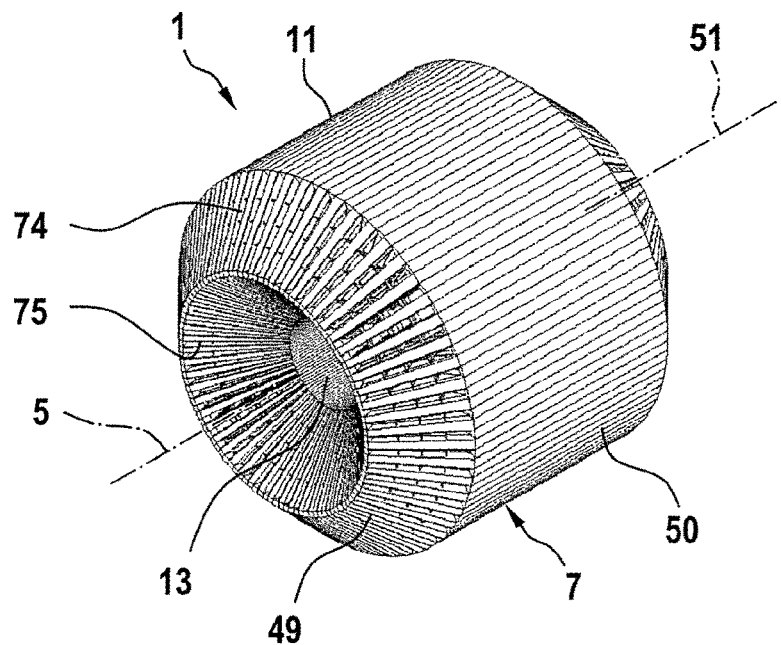
Figure 20:
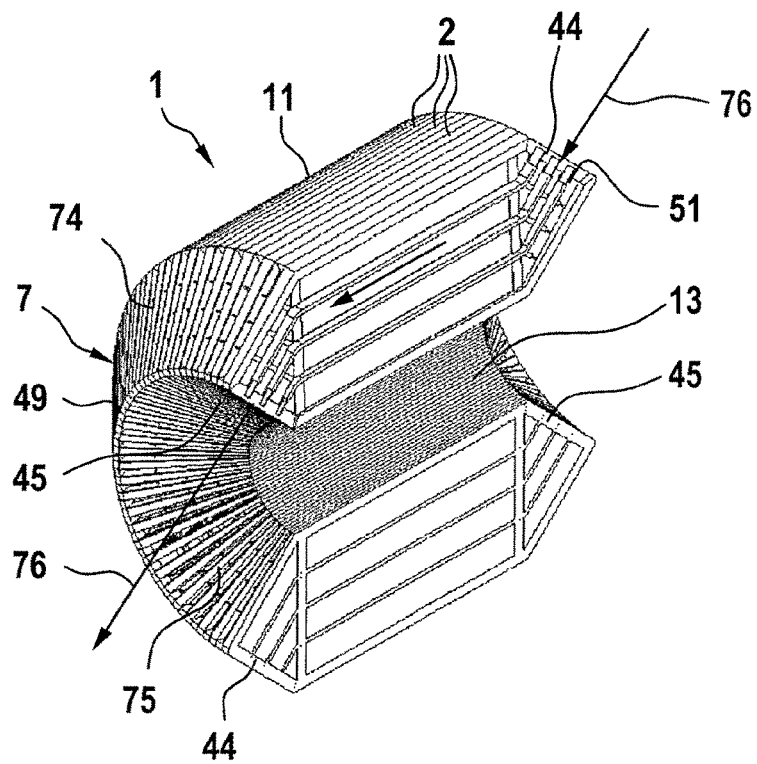
Figure 21:
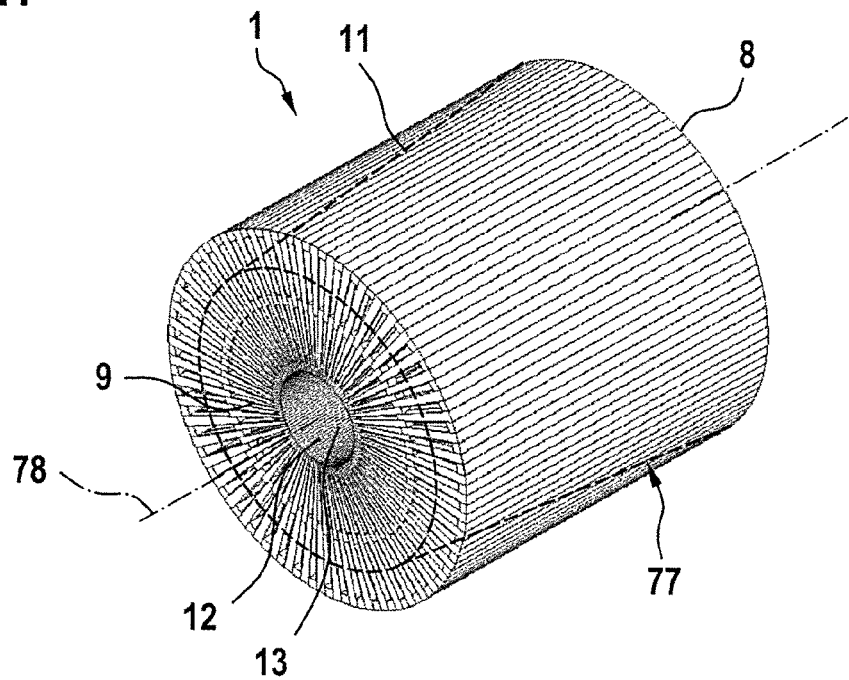
Figure 22:
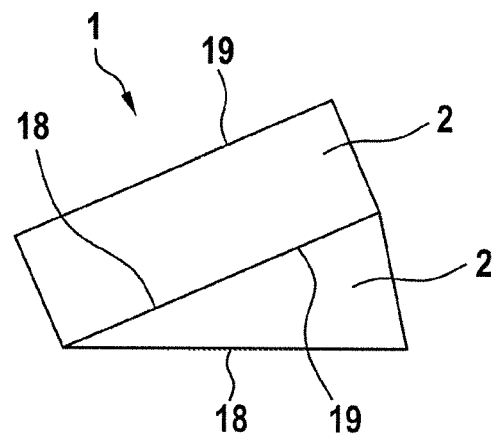

The drawings illustrate the invention using embodiments:
FIG. 1 shows a perspective view of a heat exchanger;
FIG. 2 shows a cutaway view of the heat exchanger of FIG. 1;
FIG. 3 shows a top view of a heat exchange element of the heat exchange of FIG. 1;
FIG. 4 shows a perspective side view of the heat exchange element of FIG. 3 as well as an adjacent heat exchange element, to some extent as transparent view;
FIG. 5 shows a cutaway view through the heat exchanger of FIG. 1 as well as attached components and/or an air device;
FIG. 6 shows a perspective view of the arrangement of FIG. 5, to some extent as transparent view;
FIG. 7 shows a perspective view of a further embodiment of a heat exchanger;
FIG. 8 shows a cutaway view of the heat exchanger of FIG. 7;
FIG. 9 shows a perspective view of heat exchange elements as exploded view;
FIG. 10 shows a top view of the heat exchange elements of the heat exchanger of FIG. 7;
FIG. 11 shows a side view of a component of a heat exchange element;
FIG. 12 shows a side view of a further component of the heat exchange element;
FIG. 13 shows a cutaway view through the heat exchanger of 7 with attached components and/or an air device;
FIG. 14 shows a drawing in accordance with FIG. 13 but offset by the width of a heat exchange element in circumferential direction of the heat exchanger;
FIG. 15 shows a heat exchanger in accordance with FIG. 1 according to a different embodiment, but with a different inflow and outflow;
FIG. 16 shows a longitudinal section of the heat exchanger according to FIG. 15;
FIG. 17 shows a heat exchanger according to a further embodiment in accordance with FIG. 1, but again with a different inflow and outflow;
FIG. 18 shows a longitudinal section of the heat exchanger of FIG. 17;
FIG. 19 shows a further embodiment of a heat exchanger, the middle area of which is a counterflow zone or an identical-flow zone, and the end portions of which are configured as cross-flow zone and designed to run in a roof-shaped manner (angularly);
FIG. 20 shows a longitudinal section of the heat exchanger of FIG. 19,
FIG. 21 shows a heat exchanger according to a further embodiment depicted as dotted line, wherein the heat exchanger depicted with dotted lines has a cone frustum shape and is shown as a comparison to a cylindrical heat exchanger (depicted without dotted lines); and
FIG. 22 shows a cross-section of two heat exchange elements of a heat exchanger.

DETAILED DESCRIPTION

FIG. 1 shows a heat exchanger 1. The heat exchanger 1 is designed for heat exchange between two fluids. Preferably, the two fluids are air.

The heat exchanger 1 has a multiplicity of heat exchange elements 2. For clarification, one of the heat exchange elements 2 in FIG. 1 is provided with a shading 3. The heat exchanger 1 has a cylindrical shape 4; it comprises a cylinder axis 5 which runs through the heat exchanger 1 in axial direction. As can be seen in FIG. 1, the heat exchange elements 2 are arranged adjacent to one another around the cylinder axis 5, i.e. adjoining, particularly along a closed circle.

In the embodiment of FIG. 1, the individual heat exchange elements 2 each have the shape of an annulus-sector cylinder 6. For the heat exchanger 1, the adjacent arrangement of the heat exchange elements 2 around the cylinder axis 5 results in an outline structure (outer design) similar to an annular cylinder 7. The annular cylinder 7 of the heat exchanger 1 comprises two front sides 8, 9 which are parallel opposite of one another. The annular cylinder 7 further comprises a jacket 10, which forms the outer jacket 11, and in its hollow interior 12 forms an inner jacket 13. The inner jacket 13 is particularly well depicted in FIG. 2.

According to FIG. 3, which shows a top view of a heat exchange element 2, this heat exchange element 2, due to its design as annulus-sector cylinder 6, comprises an outer jacket element 14, an inner jacket element 15, front side elements 16 and 17, wherein only the front side element 16 is shown in FIG. 3, as well as element sides 18 and 19. The element sides 18 and 19 are slightly tilted toward one another, resulting overall in approximately the form of a "cake slice" with a missing tip. In accordance with the radius of the outer jacket 11 and the inner jacket 13, the outer jacket elements 14 and 15 are designed so as to be slightly arched.

In consideration of the above description, it becomes apparent that—according to a further Embodiment—a different design of the heat exchange element 2 results in a correspondingly deviating design of the heat exchanger 1. If such a heat exchange element 2 is not configured according to FIG. 3 but instead as a triangular cylinder, particularly the outer jacket element 14 is thus configured as a plane and the inner jacket element 15 extends to the center of the heat exchanger, i.e. to the cylinder axis 5, and ends in a tip. If such heat exchange elements 2 are arranged around the cylinder axis 5, the shape of the heat exchanger, i.e. the outline structure, results in a polygonal cylinder.

According to a different embodiment, a heat exchange element 2—again deviating from the drawing of FIG. 3—can be configured as trapezoidal cylinder. This means that the outer jacket element 14 and the inner jacket element 15 are each configured as a plane, and as a result, the heat exchanger 1 assumes the outline structure of a polygonal hollow cylinder.

In a further embodiment, the heat exchange element 2 can be configured as circle-sector cylinder, i.e. the outer jacket element 14 is designed so as to be arched, and instead of the inner jacket element 15, there is a tip which extends to the cylinder axis 5. This results in a heat exchanger with an outline structure of a circular cylinder and thus corresponds to the drawing in FIG. 1, but without a circular inner channel, i.e. without the inner jacket 13.

The following descriptions regarding the inner structure of the individual heat exchange elements 2 are guided by FIGS. 1 to 6, i.e. by the design of the heat exchange elements 2 as annulus-sector cylinder 6. However, these descriptions apply correspondingly to the above-mentioned further embodiments of the heat exchange elements 2 as triangular cylinder or trapezoidal cylinder or circle-sector cylinder.

The inner structure of the heat exchange elements 2 can be seen particularly clearly in FIG. 4, which shows a cutaway view of a heat exchange element 2 in the foreground, and behind it a heat exchange element 2 largely as transparent view. The substantially only transparently depicted heat exchange element 2 in the rear is designed similar to the heat exchange element 2 shown in the foreground. Therefore, heat exchange element 2 shown in FIG. 4 in the rear comprises, similar to the heat exchange element 2 in the foreground, an outer jacket element 14, an inner jacket element 15 and similarly a plurality of radially extending radial flat ribs 21, wherein, however, the radial flat ribs 21 of the heat exchange element 2 in the background are, compared to the radial flat ribs 21 of the heat exchange element 2 in the foreground, slightly radially offset as can be seen in FIG. 4. The interior of the heat exchange element 2 in the foreground of FIG. 4 contains fluid-guiding ribs 29 which will be described in more detail below. The fluid-guiding ribs 29 serve as guide of a fluid that flows through this heat exchange element 2, wherein this takes place from the bottom right to the top left in the heat exchange element 2 in the foreground, or vice versa from the top left to the bottom right. In the heat exchange element 2 in the background of FIG. 4, the flow of a different fluid is correspondingly reversed, i.e. the appropriate fluid-guiding ribs 29 are thus arranged/configured such that the fluid is guided from the top right to the bottom left or from the bottom left to the top right (depending on the flow direction of the fluid). This different guiding of the fluids in the two aforementioned heat exchange elements 2 is repeated correspondingly in all heat exchange elements 2 of the heat exchanger 1, i.e. heat exchange elements 2 adjacent to one another always take a correspondingly different fluid direction. There is always only one first heat exchange wall 43, which will be described in more detail below, located between two adjacent heat exchange elements 2. In the following, only the heat exchange element 2 shown in the foreground in FIG. 4 shall be described in more detail. This description shall then correspondingly apply to all heat exchange elements 2.

Said heat exchange element 2 comprises—according to FIG. 4—a plurality of radially extending radial flat ribs 21, which extend between the outer jacket element 14 and the inner jacket element 15. In addition, a front side element 16 and a front side element 17 can be seen in FIG. 4. The front side element 16 extends from the inner jacket element 15 in the direction of the outer jacket element 14 such that a distance to the latter remains. The front side element 16 is supported by a support rib 22 which extends obliquely to the inner jacket element 15. The front side element 17 is arranged correspondingly. It begins at the outer jacket element 14 and extends in the direction of the inner jacket element 15, but stays spaced apart from said inner jacket element 15. In addition, a support rib 23 is provided for supporting the front side element 17, said support rib 23 running obliquely toward the outer jacket element 14. Within the heat exchange element 2, a plurality of spacer ribs 24, 25, 26, 27, and 28 is arranged which are all configured as fluid-guiding ribs 29. Due to the design of the spacer ribs 24 to 28 as fluid-guiding ribs 29, their width corresponds to the width of the heat exchange element 2 which increases over the radius, and which—as is clearly shown in FIG. 3—are is as wide in the area of the inner jacket element 15 as in the area of the outer jacket element 14. The support ribs 22, 23 also form fluid-guiding ribs 29 with the same width as described above.

The spacer rib 24 runs essentially parallel to the outer jacket element 14 and thus parallel to the cylinder axis 5 (see FIGS. 1 and 2), wherein it begins on a level with the front side element 16 and extends over almost the entire length of the heat exchange element 2, and assumes an angled profile in the area of the support rib 23 such that an oblique channel 30 is formed between the support rib 23 and the angled area 24' of the spacer rib 24. At first, the spacer rib 25 runs with an area 25' parallel to the outer jacket element 14, but its end 31 is set back, i.e. it is positioned with axial distance to the front side element 16. An angled area 25" of the spacer rib 25 runs parallel to the support rib 23 and thus forms an oblique channel 32. An end section 33 of the spacer rib 25 again runs parallel to the outer jacket element 14 and ends with radial distance and on the level of the front side element 17. With an end portion 34, the spacer rib 26 extends parallel to the outer jacket element 14. This is followed by an obliquely running area 35 which transitions into an area 26' of the spacer rib 26, wherein the latter runs parallel to the outer jacket element 14 as well as the corresponding areas of the spacer ribs 24 and 25. An angled end portion 36 of the spacer rib 26 runs parallel to the support rib 23 and thus to the corresponding area 24', 25 " of the spacer rib 24 and the spacer rib 25 and ends with axial distance to the front side element 17. The spacer rib 27 begins at axial distance to the front side element 16 with an obliquely running area 37 which transitions into an area 38, wherein the latter runs parallel to the outer jacket element 14 and to corresponding areas of the spacer ribs 24, 25, and 26. An adjacent area 39 of the spacer rib 27 runs obliquely in the direction of the inner jacket element 15 and subsequently transitions into an end section 40 which runs parallel to and at a distance from the end section 33. The spacer rib 28 runs with an end portion 41 parallel to the end portion 37 and subsequently transitions into an axial section 29', which runs parallel to the outer jacket element 14, and then transitions into an obliquely running end portion 42, which runs parallel to and at a distance from the area 39 and maintains axial distance to the front side element 17. As seen looking from the outside in, this results overall in the following sequence: Outer jacket element 14, spacer rib 24, spacer rib 25, spacer rib 26, spacer rib 27, spacer rib 28, and inner jacket element 15, wherein all components listed maintain radial distance to one another, and so corresponding channels are formed between them.

In FIG. 4, it can be seen that the element side 19 is formed by a first heat exchange wall 43 which extends over the entire surface of the heat exchange element 2 according to FIG. 4 and is depicted transparently, and so the heat exchange element 2 in the background can be seen as outline. It must also be noted that the front side elements 16 and 17 are attached to corresponding radial flat ribs 21, and the spacer ribs 24 to 28 as well as the outer jacket element 14 and the inner jacket element 15 are also held by corresponding radial flat ribs 21. The first heat exchange wall 23 is also supported by the corresponding radial flat ribs 21 but also by the spacer ribs 24 to 28 as well as the outer jacket element 14 and the inner jacket element 15. This is particularly the case if the first heat exchange wall 43 has an appropriate flexibility. In particular, the first heat exchange wall 43 is designed as film which optionally is designed so as to be diffusion-open, particularly vapor-permeable.

Since—as already mentioned—the heat exchange element 2, which follows below in FIG. 4 and is depicted transparently, with its different fluid flow direction is adjacent to the previously described heat exchange element 2, the correspondingly different, transparently depicted oblique profile of the corresponding sections and areas of the associated spacer ribs 24 to 28 is present, wherein the arrangement is preferably such that the areas of these components, running parallel to the outer jacket element 14 or inner jacket element 15, align with the corresponding areas of the identical components depicted in the foreground in FIG. 4.

Due to the distance of the front side element 16 to the outer jacket element 14, a fluid opening 44 is formed, and due to the distance of the front side element 17 to the inner jacket element 15, a fluid opening 45 is formed. The spacer rib 24 and the spacer rib 26 extend into the fluid opening 44. The spacer rib 25 and the spacer rib 27 extend into the fluid opening 45. It is clearly shown in FIG. 4 that the fluid opening 44 is located in an outer zone 46 and that the fluid opening 45 is located in an inner zone 47. The inner zone 47 lies—as seen looking in radial direction of the heat exchanger 1—further inside, and the outer zone 46 lies radially further outside. Preferably, the arrangement is made such that the inner zone 47 is adjacent—in radial direction—to the outer zone 46 without an overlap.

The aforementioned first heat exchange wall 43 is associated with each heat exchange element 2. In case of the heat exchange element 2 shown only transparently in FIG. 4, the associated first heat exchange wall lies at a distance to the apparent heat exchange wall 43 of the heat exchange element 2 depicted in the foreground. As a result, adjacent heat exchange elements 2 always have a first heat exchange wall 43 in common.

Due to the previously described design, each heat exchange element 2 is permeated by a fluid-guiding path 48 for channeling a fluid, particularly air, wherein the ends of the fluid-guiding path 48 are formed by the fluid openings 44 and 45, and the fluid-guiding path 48 is structured by the fluid spacer ribs 24 to 28, which altogether form fluid-guiding ribs 29. As a result, a fluid flowing through the fluid-guiding path 48 is appropriately channeled. Assuming, for example, that a fluid enters the fluid opening 44, it is, due to the appropriate oblique profile of corresponding areas of the fluid-guiding ribs 29, distributed substantially evenly over the entire width of the fluid-guiding path 48 and right before the exit from the fluid opening 45, it is diverted once again due to appropriately obliquely running areas of the fluid-guiding ribs 29 and can then particularly homogenously flow out of the fluid opening 45. The correspondingly obliquely running sections of the fluid-guiding ribs 29 were explained above in the description of the spacer ribs 24 to 28. The two support ribs 22 and 23 also contribute to the fluid control.

According to FIG. 4, in case of adjacent heat exchange elements 2, the fluid openings 44 and 45 are at different positions. This is due to the above described different design of adjacent heat exchange elements 2. In the heat exchange element 2 in the foreground of FIG. 4, the fluid opening 44 is located at the front side 8 in the outer zone 46, and the fluid opening 45 is located on the front side 9 in the inner zone 47. In the largely transparent heat exchange element 2 in the background, the fluid opening 45 is located on the front side 8 in the inner zone 47 and thus obliquely adjacent to the fluid opening 44 located in the outer zone 46 of the heat exchange element 2 in the foreground. The above arrangement describes the situation in an area of the front side 8. Accordingly, for an area of the front side 9, the following situation applies: In the heat exchange element 2 in the foreground, the fluid opening 45 is located—as described—in the inner zone 47. The fluid opening 44 of the rear heat exchange element 2 is located correspondingly in the outer zone 46. The previously described situation applies alternatingly to the adjacent heat exchange elements 2, i.e. over the entire annular cylinder 7 of the heat exchanger 1 according to FIG. 1.

Since, due to the described situation of adjacent heat exchange elements 2, the obliquely running areas of the spacer ribs 24 to 28 and the obliquely running support ribs 22 and 23 face in correspondingly different directions in case of adjacent heat exchange elements 2, the result is—as can be seen in FIG. 4—a zonal division into three zones, i.e. a first cross-flow zone 49, an adjacent counterflow zone 50, and an also adjacent second cross-flow zone 51 for each of the adjacent fluid-guiding paths 48 of the heat exchange elements 2, as seen looking in the direction of the longitudinal extension, i.e. in the direction of the cylinder axis 5.

From the above, it becomes apparent that the heat exchanger 1 according to the invention comprises individual heat exchange elements 2 which are arranged adjacently to form an annular cylinder 7, wherein they are each fluidically separated from one another by means of a first heat exchange wall 43, and wherein a fluid-guiding path 48 runs in each heat exchange element 2, said fluid-guiding path 48 being divided into three zones, i.e. two cross-flow zones 49 and 51 with a counterflow zone 50 in between. If two fluids are fed to the front sides 8 and 9 in the inner zone, the fluid flows of adjacent heat exchange elements 2 intersect in the cross-flow zones 48 and 51, and in the area of the counterflow zones 50, the two fluids flow in opposite directions to one another. Overall, heat is exchanged between the two fluids through the heat exchange wall 43.

The above-described operational situation is illustrated in FIG. 5, wherein one fluid is denoted with solid flow arrows and the other fluid is denoted with dotted flow arrows. The fluids are driven by means of two fans 52 and 53 which are arranged in ring collars 54 and 55, which ran parallel to the cylinder axis 5 and are arranged on the front sides 8 and 9 of the heat exchanger 1 such that the outer zone 46 is fluidically separated from the inner zone 47. The outer zone 46 is delimited on both sides of the heat exchanger 1 by means of a flow tube 56, 57, preferably having a circular cross-section. Preferably, the flow tubes 56 and 57 run parallel to the cylinder axis 5. In FIG. 5, the flow of the one fluid denoted with dotted flow arrows can be seen only in the area of the corresponding fan 53 and in the opposite outer zone 46. This results from the line of the longitudinal section through the arrangement of FIG. 5, which overall forms an air device 58. In a respective heat exchange element 2 which is adjacent to the heat exchange elements 2 from FIG. 5, a corresponding flow from right to left would occur. This fluid flow enters the inner zone 47 at the front side 9 and leaves the heat exchanger 1 in the outer zone 46 of the front side 8 and is shown with dotted arrows in FIG. 5.

FIG. 6 illustrates the arrangement of FIG. 5 in a perspective view. It can be seen that the ring collars 54 and 55 are held by radial struts 59 on the flow tube 56 or 57.

FIG. 7 shows a further embodiment of a heat exchanger 1. Similar to the heat exchanger of FIG. 1, the heat exchanger of FIG. 7 is designed to exchange heat between two fluids. The fluids are preferably air. The design of the heat exchanger 1 of FIG. 7 substantially corresponds to the design of the heat exchanger 1 of FIG. 1, and so reference is herewith made to FIGS. 1 to 6 and the corresponding descriptions. However, in the following, the differences between these two embodiments shall be explained.

FIG. 8 shows a cutaway view of the heat exchanger 1 of FIG. 7, and so it is possible to see the interior and the individual heat exchange elements 2 which are arranged adjacently around the circumference. For the two embodiments of FIGS. 1 and 7, it is conceivable that the jacket 10 consists of individual outer jacket elements 14 or is present as coherent tube section. The same applies to the inner jacket element 15 of these two embodiments. For both embodiments, it can further be provided that the front sides 8 and 9 consist of individual front side elements 16 and 17, or disk-shaped, coherent front sides 8 and 9 with corresponding fluid openings 44 and 45 are present. At the same time, the heat exchange elements 2 in both embodiments can, with regard to their outline structure, be seen as annulus-sector cylinder 6 and the entire heat exchanger can be configured as annular cylinder 7 with regard to the outline structure. For the embodiment of FIGS. 7 to 14, different outline structures for the heat exchange elements 2 and the entire heat exchanger 1 are also conceivable, as was already illustrated for the embodiment of FIG. 1.

According to FIGS. 9 and 10, the structure of the heat exchange elements 2 shall be explained in the following in more detail. The cutaway view of FIG. 10 shows a heat exchange element 2 without the associated areas of the front sides 8 and 9. This heat exchange element 2 comprises two fluid-guiding paths 48 for channeling two fluids which exchange heat among one another. Furthermore, adjacent heat exchange elements 2, i.e. their fluid-guiding paths 48, through which fluid flows, face one another.

FIG. 9 shows two types of heat exchange element components 60 and 61, wherein the heat exchange element component 60 is a first heat exchange element component 60 and the heat exchange element component 61 is a second heat exchange element component 61. In the exploded view of FIG. 9, it can be seen that—as seen looking over the circumference of the heat exchanger 1—the heat exchange element components 60 and 61 are alternatingly arranged adjacent to one another. However, in reality, the distance between these heat exchange element components 60 and 61, as shown in FIG. 9, does not exist because they are connected to one another, creating gas-proof fluid-guiding paths 48. The heat exchange element components 60 and 61 are only placed next to one another or also additionally connected to one another, for example by means of a welding process or a different joining technique.

Preferably, the heat exchange element components 60 and 61 are each designed as plastic film molded parts 62, 66, particularly in a manner known from blister technology. These plastic film molded parts 62, 66 can preferably be produced with a thermoforming process. The plastic film molded parts 62, 66 are self-supporting, i.e. they have an appropriate inherent stability, wherein the film used is gas-proof and also diffusion-resistant, and so the heat exchanger 1 produced therefrom is a sensitive heat exchanger 1 and is—unlike the embodiment of FIGS. 1 to 6—not present as enthalpy.

Using FIGS. 11 and 12, the structure of the two heat exchange element components 60 and 61 shall now be explained in more detail, followed by the assembly, particularly with regard to FIGS. 9 and 10.

The first heat exchange element component 60 comprises—according to FIG. 11—a plastic film molded part 62 which is configured as one piece and contains three zones, i.e. a first cross-flow zone 49, an adjoining counterflow zone 50 and an adjoining second cross-flow zone 51. The cross-flow zone 49 comprises deep-drawn spacer ribs 24, 25, 26, and 27 protruding forward from the plane 63 of the plastic film molded part 62, i.e. from the paper plane, wherein the spacer ribs 24 to 27 each form fluid-guiding ribs 29. As seen looking from the rear of the plastic film molded part 62, the design of the fluid-guiding ribs 29 results in corresponding indentations. The same applies to the further deep-drawn structures worked out from the plane 63 of the plastic film molded part 62 as well as the structures of the second heat exchange element component 61, which will be explained in the following. A corresponding situation is present in the second cross-flow zone 51, where spacer ribs 24 to 27 are also formed which protrude from the paper plane of FIG. 11, wherein these spacer ribs 24 to 27 also form fluid-guiding ribs 29. The spacer ribs 24 to 26 in the cross-flow zones 49 and 51 have a bent profile, and the spacer rib 27 has an angled profile. When comparing the respective spacer ribs 24 to 27 of the two sides, i.e. in the first cross-flow zone 49 and the second cross-flow zone 51, they are arranged mirror-inverted such that a fluid introduced horizontally at the top left in FIG. 11 is distributed over the entire width of the heat exchange element component 60, flows through the counterflow zone 50 and exits again horizontally on the right in the lower area. In the following, the design of the counterflow zone 50 will be described. It comprises a multiplicity of deep-drawn spacer ribs 64 and 65 which run straight and extend from the first cross-flow zone 49 to the second cross-flow zone 51 and run parallel, i.e. axially to the cylinder axis 5. The spacer ribs 64 and 65 alternate as seen looking over the width of the plastic film molded part 62, wherein a spacer rib 64 protrudes from the paper plane toward the front, and a spacer rib 65 protrudes from the paper plane toward the rear, thus creating overall a zigzag profile over the radial width of the heat exchange element component 60. According to FIG. 10, it becomes apparent that the height of this zigzag profile, as seen looking from the inside of the heat exchanger 1 outward, increases in order to achieve an appropriate annulus-sector cylinder outline (the dotted lines must be taken into consideration).

FIG. 12 shows the second heat exchange element component 61 which is designed as plastic film molded part 66 and has a plate-shaped plane 67. This plastic film molded part 66 also comprises three zones, i.e. the first cross-flow zone 49, the adjacent counterflow zone 50, and the adjacent second cross-flow zone 51. A comparison of the two cross-flow zones 49 and 51 of FIG. 12 with the corresponding zones in FIG. 11 shows that, with regard to the spacer ribs 24 to 27 which also form fluid-guiding ribs 29, they are designed so as to be "reverse," and so—again as seen looking from left to right—a fluid entering horizontally on the left side in the lower area is distributed over the entire width of the heat exchange element component 61 and flows out horizontally on the right side in the upper area. Contrary to the first heat exchange element component 60 of FIG. 11, the second heat exchange element component 61 of FIG. 12 has no structure in the counterflow zone 50 but is designed so as to be plate-shaped planar in accordance with the plane 67.

Using FIG. 9, the assembly of the heat exchange element components 60 and 61 shall now be described. The drawing shows that the end edges of the spacer ribs 65 contact the front side 68, shown in FIG. 12, of the adjacent heat exchange element component 61. When assembled, the end edges of the spacer ribs 64 (due to the perspective depiction in FIG. 9, only one spacer rib 64 is shown) contact the rear side 69 of the adjacent heat exchange element component 61. Accordingly, in the two cross-flow zones 49 and 51 of the first heat exchange element component 60, the end edges of the spacer ribs 24 to 27 also contact the rear side 69 of the second heat exchange element component 61. The end edges of the spacer ribs 24 to 27 of the second heat exchange element component 61 contact the rear side 70 of the first heat exchange element component 60. This above described situation is present in all adjacent heat exchange element components 60 and 61 and results in a heat exchanger 1 as will be described in the following using particularly FIGS. 13 and 14.

However, with regard to FIG. 10 it must also be noted that, due to the zigzag design of the first heat exchange element component 60, one fluid-guiding path 48 each is formed on the two sides of plane 63, i.e. such an annulus-sector cylinder 6 as shown in FIG. 10, i.e. such a heat exchange element 2, comprises two fluid-guiding paths 48.

The corresponding delimitation of the outline structure of this heat exchange element 2 from FIG. 10 is indicated with a dotted line and is formed—according to the previous embodiments—by the opposite areas of the adjacent heat exchange element components 61. These areas are "common areas." The heat exchange element 2 of FIG. 10 is thus formed by the heat exchange element component 60 and the heat exchange element component 61 which is indicated by the double-dotted line.

This results in the following situation, wherein FIGS. 13 and 14—similarly to FIGS. 5 and 6—show an air device 58, i.e. show the heat exchanger 1 with further attached components, namely the fans 52 and 53, the ring collars 54 and 55, and the flow tubes 56 and 57, wherein the latter can also be formed by a continuous tube.

FIG. 13 illustrates with continuous arrows the (left to right) flow of the first fluid which is driven by the fan 52, wherein said fan 52 feeds the first fluid to the inner zone 47 of the heat exchanger 1. The first fluid, which enters the corresponding fluid opening 45, is, due to the appropriately designed fluid ribs 29, distributed in the first cross-flow zone 49 and thus reaches the counterflow zone 58, and from there, the flow of the first fluid is guided in the second cross-flow zone 51 with a radial component outward through the fluid opening 44 to the outer zone 46, and it thus again exits from the ring space between the ring collar 55 and the flow tube 57. FIG. 14 shows with dotted arrows the (right to left) flow of a second fluid which is fed to the heat exchanger 1 by means of the fan 53, i.e. toward the corresponding fluid opening 45 in the inner zone 47. The flow conditions are similar to those for FIG. 13, i.e. the second fluid passes the counterflow zone 50 and is then directed outward in the cross-flow area 49 and thus reaches the outer zone 46 through the fluid opening 44. Since the individual fluid-guiding paths 48 thus formed are separated from one another as seen looking over the circumference of the heat exchanger 1, heat is exchanged through the material of the heat exchange element components 60, 61, i.e. the two aforementioned fluids experience a heat exchange.

For the heat exchange element 2 of the embodiment of FIGS. 7 to 14, the heat exchange element component 61 represents a first heat exchange wall 43 which allows for a heat exchange to an adjacent heat exchange element 2. The heat exchange element component 60 of the heat exchange element 2 represents a second heat exchange wall 71 which separates the first and the second fluid-guiding path 48 in this heat exchange element 2 from one another.

The previous description and the following embodiments illustrate that the individual heat exchange element 2 is designed so as to be wedge-shaped. It comprises at least one fluid-guiding path 48 which extends in axial direction for a fluid to flow through, wherein the heat exchange element 2, due to its wedge-shaped design, has a wedge-shaped cross-section surface, wherein the axial direction, i.e. the aforementioned cylinder axis 5 or the cone frustum axis mentioned below, runs at a right angle or approximately at a right angle to the wedge-shaped cross-section surface.

FIG. 15 shows a further embodiment of a heat exchanger 1. This embodiment differs from the embodiment of FIG. 1 particularly because the fluid openings 44 and 45 are in a different position. Looking at the many adjacent heat exchange elements 2, it becomes apparent that one fluid opening 43 lies at the outer jacket 11, and the associated fluid opening 45 lies on the front side 8. At the adjacent heat exchange element 2, the situation is similar, i.e. the fluid opening 44 is also located on the outer jacket 11 but in the opposite edge area relative to the aforementioned fluid opening 44 of the adjacent heat exchange element 2, and the associated fluid opening 45 is located at the front side 9. The situation can be seen particularly clearly in FIG. 16 which shows a longitudinal section. The central area of the heat exchanger of FIG. 15 is configured similarly or exactly like the corresponding area of the embodiment of FIG. 1. The course of the flow of a fluid is shown in FIG. 16 by means of arrows 72. According to a further embodiment, a corresponding design according to FIGS. 15 and 16 can of course also be present if no annular cylinder is present but instead a circular cylinder, a polygonal cylinder, or a polygonal hollow cylinder is used for the outline structure of the entire heat exchanger 1.

FIGS. 17 and 18 correspond to FIGS. 15 and 16, wherein, however, the position of the in- and outflow for the fluids is designed differently, i.e. such that the fluid openings 44 are located at the outer jacket 11, and the fluid openings 45 are located on the inner jacket 13, resulting in a flow profile for a fluid according to arrow 73 (see particularly FIG. 18). Otherwise, reference is made to the previous descriptions for FIGS. 15 and 16 as well as FIG. 1.

The embodiment of FIG. 19 substantially corresponds to the embodiment of FIG. 1, wherein, however, only the counterflow zone 50 is designed so as to be cylindrical. Instead of the counterflow zone 50, it is also possible for an identical-flow zone to be present. The two cross-flow zones 49 and 51 are designed so as to be roof-shaped and run around the cylinder axis 5. As a result, there are no planar front sides but sides 74 and 75 that are positioned in a roof-shaped manner (angled) to one another and are provided with corresponding fluid openings 44 and 45. The flow profile of one of the wedge-shaped heat exchange elements 2 can be seen in FIG. 20 in accordance with the depicted arrows 76. Otherwise, the descriptions for the embodiments of FIGS. 1, 15 to 18 apply accordingly to the embodiment of FIGS. 19 and 20.

FIG. 21 shows a further embodiment of a heat exchanger 1, the outline structure of which is designed as or substantially as a cone frustum 77. The cone frustum 77 comprises a cone frustum axis 78. FIG. 21 only shows the outline structure as a dotted line when compared to the outline structure of the heat exchanger 1 of FIG. 1, which is shown with solid lines. However, for a person skilled in the art, it becomes immediately apparent how the heat exchange elements 2 and—according to the different previous embodiments—the position of the fluid openings 44 and 45 will have to be configured specifically. Of course, in case of the cone frustum shape of FIG. 21, the center can also be designed so as not to be hollow but instead extend to the cone frustum axis 78. Furthermore, the interior 12, i.e. the hollow area, can be designed so as to be cylindrical or also conical, i.e. cone-shaped.

FIG. 22 shows a cross-section of a heat exchanger 1, having a wedge-shaped heat exchange element 2 which is adjacent to a not wedge-shaped heat exchange element 2. In the wedge-shaped heat exchange element 2, the element sides 18 and 19 are angular to one another. In the adjacent, not wedge-shaped heat exchange element 2, the element sides 18 and 19 are, for example, parallel to one another. With an appropriate selection, arrangement, and number of correspondingly equipped heat exchange elements 2, it is possible to realize a desired heat exchanger 1.

The invention claimed is:

1. A heat exchanger for heat exchange between at least two fluids, the heat exchanger comprising:

a plurality of heat exchange elements, each heat exchange element having at least one fluid-guiding path for conducting a fluid there through,
  wherein each heat exchange element defines an axis and includes first and second cross-flow zones and a third zone axially between the first and second cross-flow zones, the third zone being one of a counterflow zone and an identical-flow zone, and each heat exchange element has a first heat exchange wall, which forms a common heat exchange wall for a corresponding heat exchange element and for an adjacent heat exchange element, and at least one fluid-guiding rib is arranged between adjacent first heat exchange walls, the at least one fluid-guiding rib being a longitudinally elongated fluid-guiding rib in at least one of the first and second cross-flow zones, the at least one fluid-guiding rib having a first portion running oblique to the axis and a second portion running parallel to the axis, the at least one fluid-guiding rib having first and second radially facing sides, the at least one fluid-guiding rib arranged in the heat exchanger for the flow of fluid across first and second radial sides; and
  a plurality of spacer ribs arranged parallel to the cylinder axis in the counterflow zone extending from the first cross-flow zone to the second cross-flow zone, the plurality of spacer ribs being longitudinally elongated.

2. The heat exchanger according to claim 1, wherein the heat exchanger shape at least substantially has cone frustum shape.

3. The heat exchanger according to claim 1, wherein each heat exchange element has a first and a second fluid-guiding paths, each for conducting one of the fluids.

4. The heat exchanger according to claim 3, wherein each heat exchange element has a second heat exchange wall which separates the first and the second fluid-guiding paths from one another.

5. The heat exchanger according to claim 4, wherein the second heat exchange wall is designed so as to keep adjacent first heat exchange walls at a distance from one another.

6. The heat exchanger according to claim 4, wherein the second heat exchange wall has at least in sections an uneven, particularly zigzag-shaped, wavelike and/or meandering profile.

7. The heat exchanger according to claim 4, wherein at least one of the first and one of the second heat exchange wall extends from an outer side/outer jacket of the heat exchanger to an inner side/inner jacket or a center/cylinder axis/cone frustum axis of the heat exchanger.

8. The heat exchanger according to claim 4, wherein at least one spacer rib is arranged between adjacent first and second heat exchange walls.

9. The heat exchanger according to claim 4, wherein at least one of the first heat exchange wall and the second heat exchange wall is moisture-permeable.

10. The heat exchanger according to claim 1, wherein the heat exchanger has two front sides, which are opposite one another and comprise fluid openings, particularly fluid inlet and fluid outlet openings.

11. The heat exchanger according to claim 1, wherein the heat exchanger has an outer jacket and two front sides, which are opposite one another, and that at least one of the front sides and the outer jacket comprise the fluid inlet and fluid outlet openings.

12. The heat exchanger according to claim 1, wherein the at least one spacer rib has a length greater than half of the length of the heat exchanger which extends between the front sides.

13. The heat exchanger according to claim 1, wherein the heat exchanger has two front sides which are opposite one another and comprise fluid openings, the fluid openings in an inner zone on one of the front sides are fluid inlet openings for a first fluid, and that the fluid openings in an outer zone, which extends around the inner zone, on the other front side are fluid outlet openings for the first fluid, and that the fluid openings in the inner zone on the other front side are fluid inlet openings for a second fluid, and that the fluid openings in the outer zone on the one front side are fluid outlet openings for the second fluid.

14. The heat exchanger according to claim 13, wherein at least one of the front sides comprises an inner zone and an outer zone which extends around the inner zone, wherein fluid openings in the inner zone are fluid inlet openings, and fluid openings in the outer zone are fluid outlet openings, or wherein fluid openings in the outer zone are fluid inlet openings, and fluid openings in the inner zone are fluid outlet openings.

15. The heat exchanger according to claim 14, wherein the fluid openings in the inner zone on one of the front sides are fluid inlet openings for a first fluid, and that the fluid openings in the outer zone on the other front side are fluid outlet openings for the first fluid, and that the fluid openings in the inner zone on the other front sides are fluid inlet openings for a second fluid, and that the fluid openings in the outer zone on the one front side are fluid outlet openings for the second fluid.

16. The heat exchanger according to claim 13, further comprising at least one ring collar arranged on at least one of the front sides of the heat exchanger so as to fluidically separate the fluid inlet openings from the fluid outlet openings located at the front side.

17. The heat exchanger according to claim 1, wherein the spacer rib has a spacer rib length greater than two thirds of an axial length of the heat exchanger.

18. The heat exchanger according to claim 1, further comprising:
a first fluid opening at a first axial side of the plurality of heat exchanger elements; and
a second fluid opening at a second axial side of the plurality of heat exchanger elements, the second fluid opening radially spaced from the first fluid opening,
wherein a flow of air from the first fluid opening to the second fluid opening is routed by the plurality of heat exchanger elements in both an axial direction and a radial direction.

19. The heat exchanger according to claim 18, wherein the second opening is a toroidal shaped opening with an inner dimension approximately equal to an outer dimension of the first opening.

20. The heat exchanger according to claim 1, wherein the wedge-shaped cross-sectional surface of each heat exchange element is at an approximate right angle to a heat exchanger axis of the heat exchanger.

21. The heat exchanger according to claim 1, wherein the plurality of each heat exchange elements are circumferentially arranged about an axis of the heat exchanger and cooperate to define an axially extending opening of the heat exchanger.

22. The heat exchanger according to claim 1, wherein adjacent heat exchange elements abut one another and the heat exchange elements cooperate to define a closed circle in a radial direction.

23. The heat exchanger according to claim 1, wherein the at least one fluid-guiding rib is longitudinally spaced from the plurality of spacer ribs.

24. The heat exchanger according to claim 1, wherein the at least one fluid-guiding rib includes at least a first fluid-guiding rib in the first cross-flow zone and at least a second fluid-guiding rib in the second cross-flow zone.

25. The heat exchanger according to claim 1, wherein the at least one fluid-guiding rib includes a first plurality of fluid-guiding ribs in the first cross-flow zone and a second plurality of fluid-guiding ribs in the second cross-flow zone, each fluid-guiding rib of the first and second pluralities of fluid-guiding ribs having the first portion running oblique to the axis and the second portion running parallel to the axis.

26. The heat exchanger according to claim 1, wherein the heat exchanger has a cylindrical shape with a cylindrical axis, the heat exchange elements being arranged adjacent to one another round the cylindrical axis.

27. A heat exchanger comprising:
a plurality of heat exchange elements, each heat exchange element having at least one fluid-guiding path for conducting at least fluid therethrough;
a first fluid opening at a first axial side of the plurality of heat exchanger elements; and
a second fluid opening at a second axial side of the plurality of heat exchanger elements, the second fluid opening radially spaced from the first fluid opening,
wherein each heat exchange element defines an axis and includes first and second cross-flow zones and a third zone axially between the first and second cross-flow zones, the third zone being one of a counterflow zone and an identical-flow zone, and each heat exchange element has a first heat exchange wall, which forms a common heat exchange wall for a corresponding heat exchange element and for an adjacent heat exchange element, and at least one fluid-guiding rib arranged between adjacent first heat exchange walls, the at least one fluid-guiding rib being a longitudinally elongated fluid-guiding rib in at least one of the first and second cross-flow zones, the at least one fluid-guiding rib having a first portion running oblique to the axis and a second portion running parallel to the axis, the at least one fluid-guiding rib having first and second radially facing sides, the at least one fluid-guiding rib arranged in the heat exchanger for the flow of fluid across first and second radial sides; and
a plurality of spacer ribs arranged parallel to the cylinder axis in the counterflow zone extending from the first cross-flow zone to the second cross-flow zone, the plurality of spacer ribs being longitudinally elongated,
wherein a flow of air from the first fluid opening to the second fluid opening is routed by the plurality of heat exchanger elements in both an axial direction and a radial direction.

28. The heat exchanger according to claim 27, wherein the wedge-shaped cross-sectional surface of each heat exchange element is at an approximate right angle to a heat exchanger axis of the heat exchanger.

29. The heat exchanger according to claim 27, wherein the plurality of each heat exchanger elements are circumferentially arranged about an axis of the heat exchange and cooperate to define an axially extending opening of the heat exchanger.

30. The heat exchanger according to claim 27, wherein adjacent heat exchange elements abut one another and the heat exchange elements cooperate to define a closed circle in a radial direction.

31. The heat exchanger according to claim 27, wherein the at least one fluid-guiding rib is longitudinally spaced from the plurality of spacer ribs.

32. The heat exchanger according to claim 27, wherein the at least one fluid-guiding includes at least a first fluid-guiding rib in the first cross-flow zone and at least a second fluid-guiding rib in the second cross-flow zone.

33. The heat exchanger according to claim 27, wherein the at least one fluid-guiding rib includes a first plurality of fluid-guiding ribs in the first cross-flow zone and a second plurality of fluid-guiding ribs in the second cross-flow zone, each fluid-guiding rib of the first and second pluralities of fluid-guiding ribs having the first portion running oblique to the axis and the second portion running parallel to the axis.

34. The heat exchanger according to claim 27, wherein the heat exchanger has a cylindrical shape with a cylindrical axis, the heat exchange elements being arranged adjacent to one another round the cylindrical axis.

\* \* \* \* \*